US012250632B2

(12) United States Patent
Murray et al.

(10) Patent No.: US 12,250,632 B2
(45) Date of Patent: Mar. 11, 2025

(54) DRX CONFIGURATION IN NEW RADIO

(71) Applicant: InterDigital Patent Holdings, Inc., Wilmington, DE (US)

(72) Inventors: Joseph M. Murray, Schwenksville, PA (US); Pascal M. Adjakple, Great Neck, NY (US); Stephen E. Terry, Northport, NY (US); Rocco Di Girolamo, Laval (CA); Lakshmi R. Iyer, King of Prussia, PA (US); Guodong Zhang, Woodbury, NY (US); Patrick Svedman, Stockholm (SE); Yifan Li, Conshohocken, PA (US); Allan Y. Tsai, Boonton, NJ (US); Zhuo Chen, Claymont, DE (US); Mohamed Awadin, Plymouth Meeting, PA (US); Qing Li, Princeton Junction, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 643 days.

(21) Appl. No.: 17/442,728

(22) PCT Filed: Mar. 27, 2020

(86) PCT No.: PCT/US2020/025233
§ 371 (c)(1),
(2) Date: Sep. 24, 2021

(87) PCT Pub. No.: WO2020/198594
PCT Pub. Date: Oct. 1, 2020

(65) Prior Publication Data
US 2022/0191793 A1 Jun. 16, 2022

Related U.S. Application Data

(60) Provisional application No. 62/886,689, filed on Aug. 14, 2019, provisional application No. 62/824,702, filed on Mar. 27, 2019.

(51) Int. Cl.
*H04W 52/02* (2009.01)
*H04W 72/044* (2023.01)
(Continued)

(52) U.S. Cl.
CPC ..... *H04W 52/0232* (2013.01); *H04W 72/044* (2013.01); *H04W 72/23* (2023.01); *H04W 80/02* (2013.01)

(58) Field of Classification Search
None
See application file for complete search history.

(56) References Cited

U.S. PATENT DOCUMENTS

2011/0002281 A1 1/2011 Terry et al.
2012/0281600 A1 11/2012 Tseng et al.
(Continued)

FOREIGN PATENT DOCUMENTS

CN 102448151 A 5/2010
CN 102098735 A 6/2011
(Continued)

OTHER PUBLICATIONS

3rd Generation Partnership Project, "Technical Specification Group Radio Access Network, NR; Medium Access Control (MAC) protocol specification (Release 15)", 3GPP TS 38.321 V15.0.0 (Dec. 2017), Valbonne, France, 55 pages.
(Continued)

*Primary Examiner* — Alex Skripnikov
(74) *Attorney, Agent, or Firm* — Flaster Greenberg P.C.

(57) ABSTRACT

A first apparatus including a processor; and a memory storing computer-executable instructions that when executed by the processor cause the first apparatus to: receive, from a second apparatus, information including Discontinuous Reception (DRX) configurations, wherein one of the DRX configurations is a first active DRX con-
(Continued)

Serving cells with independent active times figuration and other DRX configurations are candidate DRX configurations; perform Physical Downlink Control Channel (PDCCH) monitoring in accordance with the first active DRX configuration; monitor signaling from the second apparatus for an indication that is used for adapting the first active DRX configuration; receive from the second apparatus an indication for adapting the first active DRX configuration into a second active DRX configuration; based on the indication for adapting the first active DRX configuration into the second active DRX configuration, adapt the first active DRX configuration into the second active DRX configuration; and perform PDCCH monitoring in accordance with the second active DRX configuration.

20 Claims, 16 Drawing Sheets

(51) Int. Cl.
*H04W 72/23* (2023.01)
*H04W 80/02* (2009.01)

(56) References Cited

U.S. PATENT DOCUMENTS

| | | | |
|---|---|---|---|
| 2013/0163497 A1 | 6/2013 | Wei | |
| 2014/0242989 A1* | 8/2014 | Cai | H04W 52/54 455/450 |
| 2015/0085684 A1 | 3/2015 | Sadek et al. | |
| 2015/0304955 A1 | 10/2015 | Manepalli et al. | |
| 2015/0365995 A1 | 12/2015 | Tabet et al. | |
| 2016/0255676 A1 | 9/2016 | Vajapeyam et al. | |
| 2019/0098689 A1* | 3/2019 | Wei | H04W 76/28 |
| 2019/0158229 A1* | 5/2019 | Wei | H04L 1/1848 |
| 2019/0215729 A1* | 7/2019 | Oyman | H04L 65/1016 |
| 2019/0268965 A1* | 8/2019 | Jang | H04L 5/0094 |

FOREIGN PATENT DOCUMENTS

| | | | | |
|---|---|---|---|---|
| CN | 105764126 A | | 7/2016 | |
| EP | 3554183 A1 | | 10/2019 | |
| WO | 2018/128463 A1 | | 7/2018 | |
| WO | 2019/033017 A1 | | 2/2019 | |
| WO | 2019030079 A1 | | 2/2019 | |
| WO | WO-2020130930 A1 | * | 6/2020 | H04W 52/0216 |

OTHER PUBLICATIONS

CN 102098735 A, Cited in Office Action, dated Feb. 7, 2024, in related Chinese Patent Application No. 202080024952.0.
"3rd Generation Partnership Project; Technical Specification Group Radio Access Network; NR; Study on UE Power Saving (Release 16)", 3GPP Standard; Technical Report; 3GPP TR 38.840, 3rd Generation Partnership Project (3GPP), Mobile Competence Centre; 650, Route Des Lucioles ; F-06921 Sophia-Antipolis Cedex; France, No. V1.0.0, Mar. 14, 2019, pp. 1-70, XP051722784.
Oppo: "UE Adaptation to the Traffic and UE Power Consumption", 3GPP Draft; R1-1902745, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019, Feb. 16, 2019, XP051600440.
3rd Generation Partnership Project; Technical Specification Group Radio Access Network; NR; Study on UE Power Saving (Release 16), 3GPP TR 38.840, v16.0.0, Jun. 2019.

* cited by examiner

| $S_7$ | $S_6$ | $S_5$ | $S_4$ | $S_3$ | $S_2$ | $S_1$ | R | Oct 1 |
|---|---|---|---|---|---|---|---|---|
| $S_{15}$ | $S_{14}$ | $S_{13}$ | $S_{12}$ | $S_{11}$ | $S_{10}$ | $S_9$ | $S_8$ | Oct 2 |
| $S_{23}$ | $S_{22}$ | $S_{21}$ | $S_{20}$ | $S_{19}$ | $S_{18}$ | $S_{17}$ | $S_{16}$ | Oct 3 |
| $S_{31}$ | $S_{30}$ | $S_{29}$ | $S_{28}$ | $S_{27}$ | $S_{26}$ | $S_{25}$ | $S_{24}$ | Oct 4 |

Cross-carrier configuration MAC CE

FIG. 11

DRX CONFIGURATION IN NEW RADIO

CROSS-REFERENCE TO RELATED APPLICATIONS

This application is the National Stage Application of International Patent Application No. PCT/US2020/025233, filed Mar. 27, 2020 which claims the benefit of U.S. Provisional Application No. 62/886,689, filed on Aug. 14, 2019, and U.S. Provisional Application No. 62/824,702, filed on Mar. 27, 2019, the entire contents of which are incorporated by reference herein.

FIELD

The present disclosure relates generally to wireless communications, and more particularly to wireless communications systems, devices, methods, and computer readable medium with User Equipment (UE) that provide enhanced power savings when used in New Radio (NR) systems.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

As many UE devices are battery powered devices, and the processing demands on UEs increases substantially with NR, the present inventors recognized that saving power at a UE is a top priority. As also recognized by the present inventors, existing power savings mechanisms defined for NR (e.g. Discontinuous Reception (DRX), Bandwidth Part (BWP) operation) cannot adapt to the changing traffic patterns quickly enough to optimize the power consumption while at the same time minimize the negative impacts on latency and User Perceived Throughput (UPT).

SUMMARY

An exemplary embodiment of the present disclosure provides a first apparatus including a processor; and a memory storing computer-executable instructions that when executed by the processor cause the first apparatus to: receive, from a second apparatus, information including a plurality of Discontinuous Reception (DRX) configurations, wherein one of the plurality of DRX configurations is a first active DRX configuration and other DRX configurations are candidate DRX configurations; perform Physical Downlink Control Channel (PDCCH) monitoring in accordance with the first active DRX configuration; monitor signaling from the second apparatus for an indication that is used for adapting the first active DRX configuration; receive from the second apparatus an indication for adapting the first active DRX configuration into a second active DRX configuration; based on the indication for adapting the first active DRX configuration into the second active DRX configuration, adapt the first active DRX configuration into the second active DRX configuration; and perform PDCCH monitoring in accordance with the second active DRX configuration.

An exemplary embodiment of the present disclosure provides a method performed by a first apparatus, the method includes: receiving, from a second apparatus, information including a plurality of Discontinuous Reception (DRX) configurations, wherein one of the plurality of DRX configurations is a first active DRX configuration and other DRX configurations are candidate DRX configurations; performing Physical Downlink Control Channel (PDCCH) monitoring in accordance with the first active DRX configuration; monitoring signaling from the second apparatus for an indication that is used for adapting the first active DRX configuration; receiving from the second apparatus an indication for adapting the first active DRX configuration into a second active DRX configuration; based on the indication for adapting the first active DRX configuration into the second active DRX configuration, adapting the first active DRX configuration into the second active DRX configuration; and performing PDCCH monitoring in accordance with the second active DRX configuration.

An exemplary embodiment of the present disclosure provides a non-transitory computer-readable medium including computer-executable instructions, which when executed by a first apparatus, cause the first apparatus to perform a method, the method comprising: receiving, from a second apparatus, information including a plurality of Discontinuous Reception (DRX) configurations, wherein one of the plurality of DRX configurations is a first active DRX configuration and other DRX configurations are candidate DRX configurations; performing Physical Downlink Control Channel (PDCCH) monitoring in accordance with the first active DRX configuration; monitoring signaling from the second apparatus for an indication that is used for adapting the first active DRX configuration; receiving from the second apparatus an indication for adapting the first active DRX configuration into a second active DRX configuration; based on the indication for adapting the first active DRX configuration into the second active DRX configuration, adapting the first active DRX configuration into the second active DRX configuration; and performing PDCCH monitoring in accordance with the second active DRX configuration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The scope of the present disclosure is best understood from the following detailed description of exemplary embodiments when read in conjunction with the accompanying drawings, wherein:

FIG. 11 is an illustration of a an exemplary Cross-Carrier Configuration MAC CE in accordance with an exemplary embodiment;

Figure 1A:
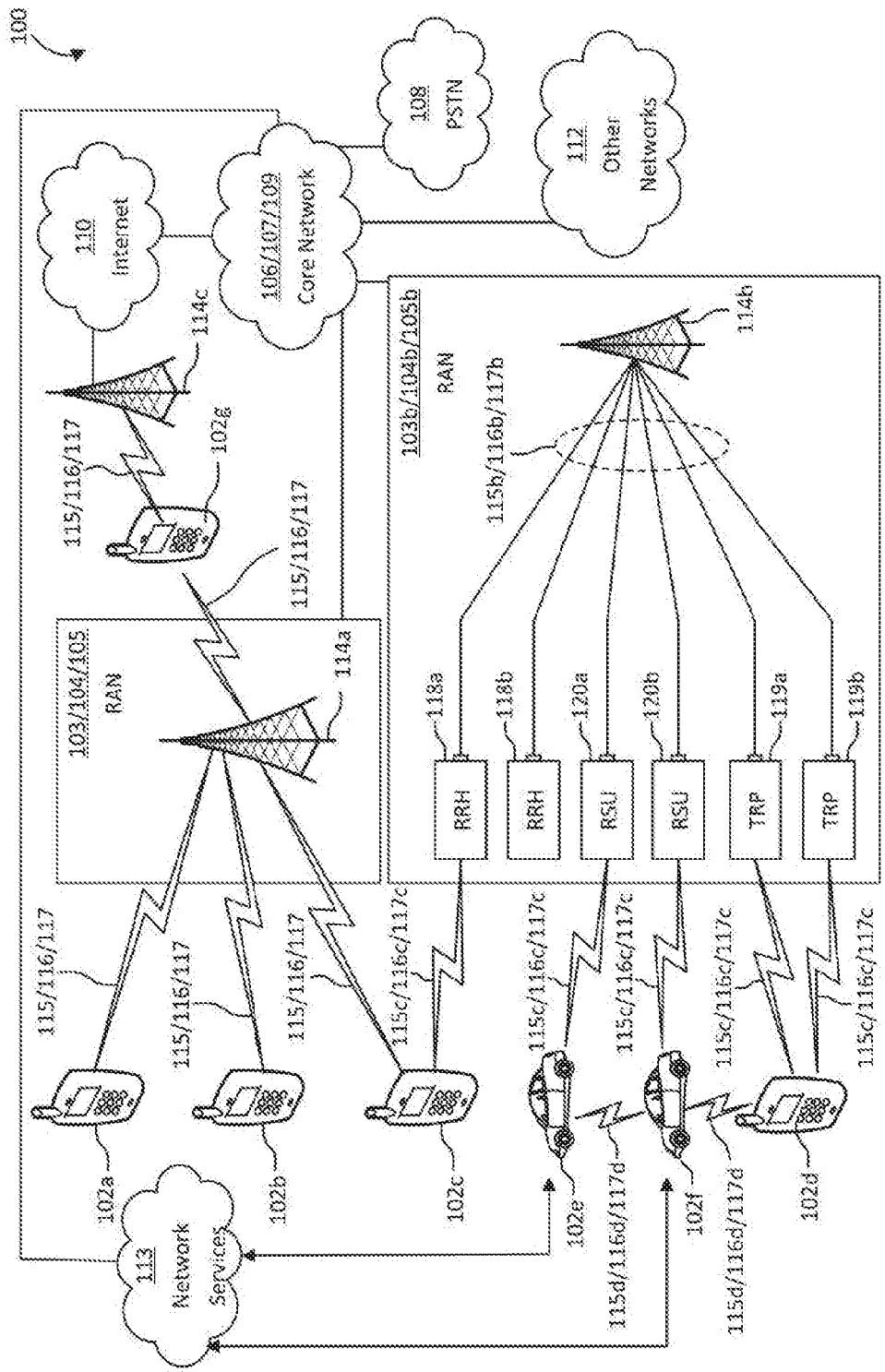
FIG. 1A is a system diagram that shows an example 3GPP architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/1041105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway may be a Residential Gateway (RG). The RG may provide connectivity to a Core Network 106/107/109. It will be appreciated that many of the ideas contained herein may equally apply to UEs that are WTRUs and UEs that use a wired connection to connect to a network.

For example, the ideas that apply to the wireless interfaces 115, 116, 117 and 115c/116c/117c may equally apply to a wired connection.

Figure 1B:
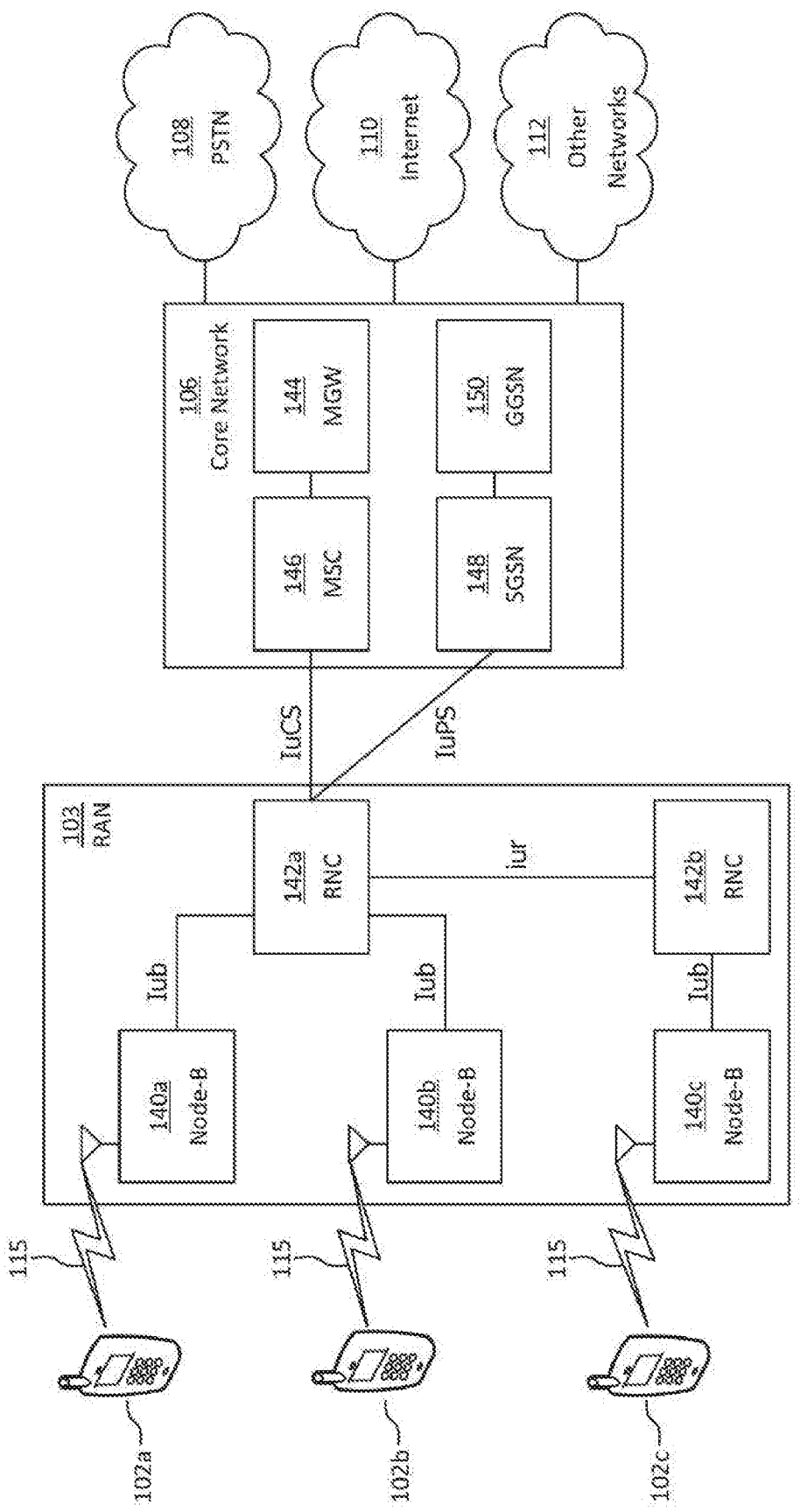
FIG. 1B is a system diagram that shows an example of a Radio Access Network (RAN) architecture and a core network architecture.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
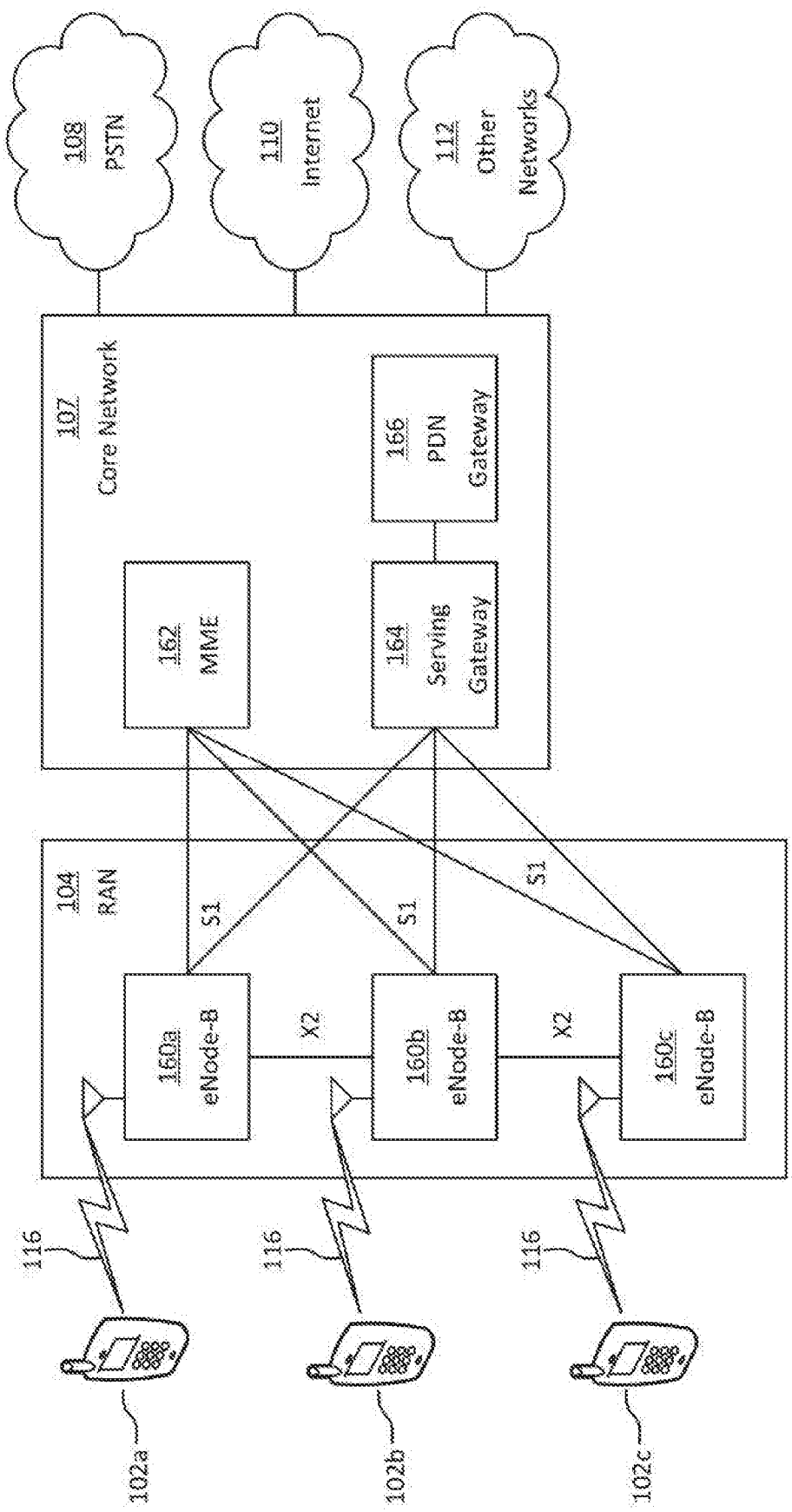
FIG. 1C is a system diagram that shows an example of a Radio Access Network (RAN) architecture and a core network architecture.

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
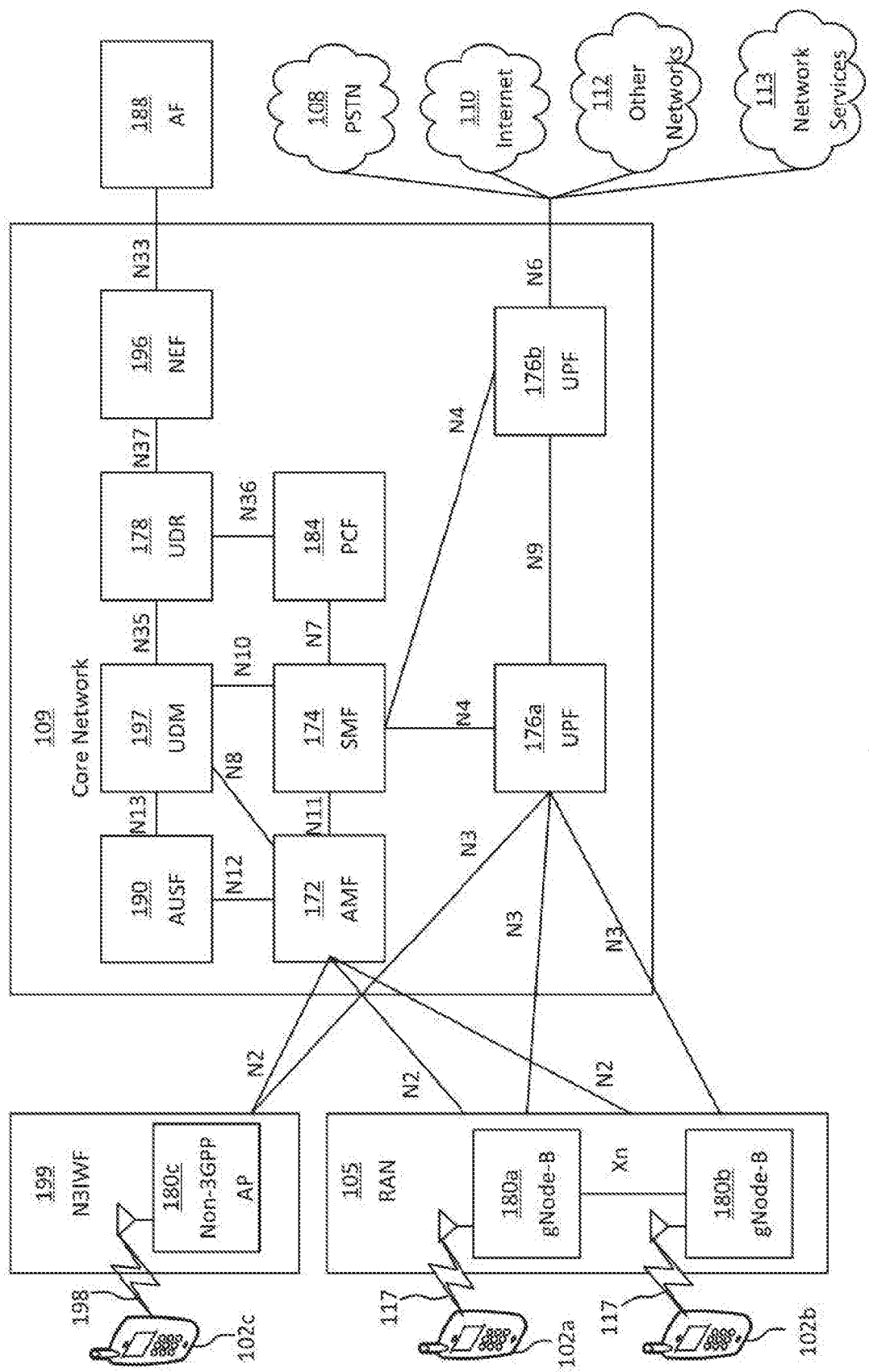
FIG. 1D is a system diagram that shows an example of a Radio Access Network (RAN) architecture and a core network architecture.

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 may include an access and mobility management function (AMF) 172, a Session Management Function (SMF) 174. User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
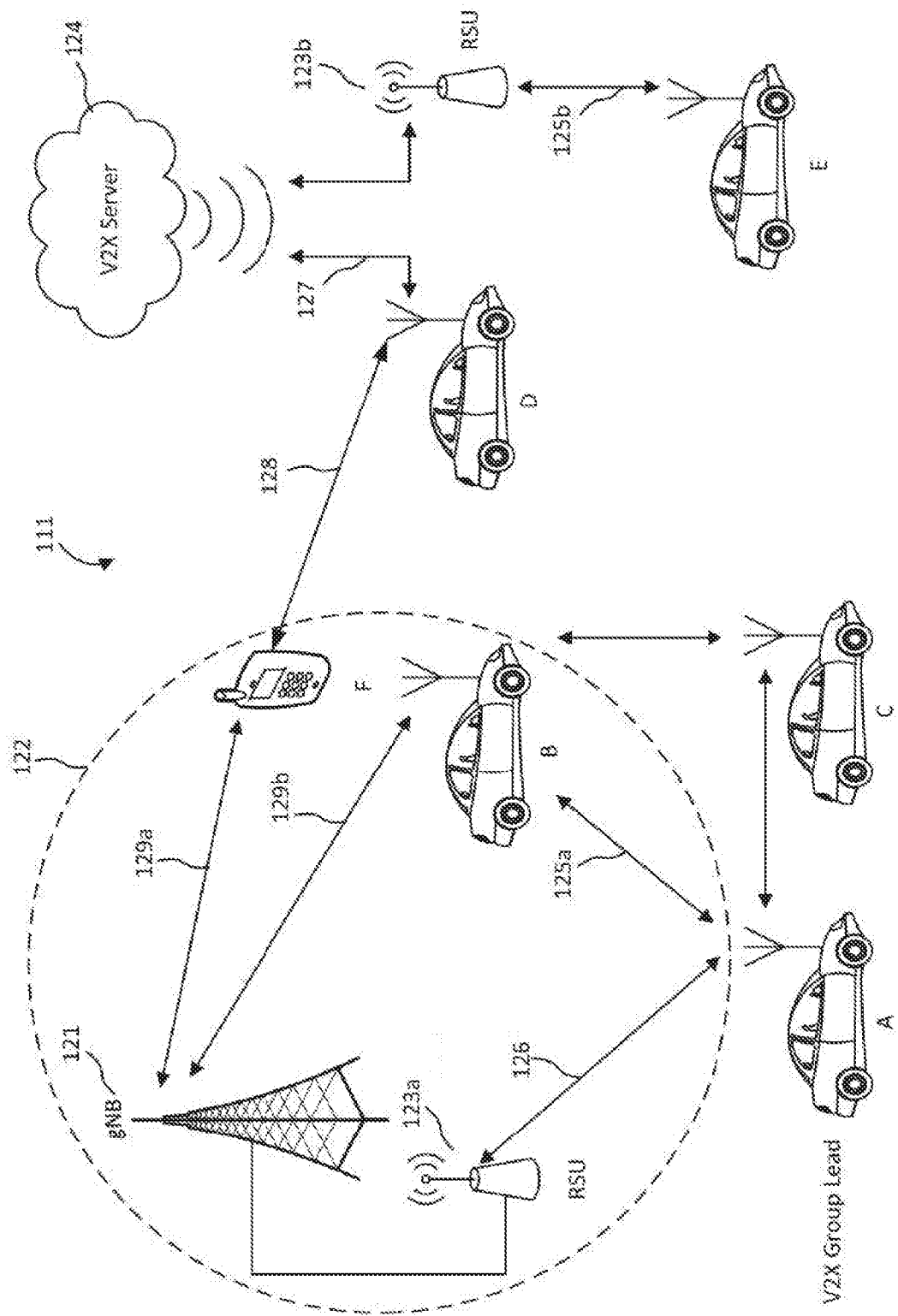
FIG. 1E is a system diagram that shows an example 3GPP architecture.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 122. WTRUs A, B, and C form a V2X group, among which WTRU A is the group lead and WTRUs B and C are group members.

WTRUs A, B. C, D, E, F may communicate with each other over a Uu interface 129b via the gNB 121 if they are under the access network coverage (only B and F are shown under the network coverage in FIG. 1E). WTRUs A, B, C, D, E, F may communicate with each other directly via a Sidelink (PC5 or NR PC5) interface 125a,125b, 128, if they are under or out of the access network coverage (e.g., A, C, WTRUs A, B, C. D, E, F may communicate with each other D and E are shown out of the network coverage in FIG. 1E).

WTRUs A, B. C, D, E, and F may communicate with RSU 123a or 123b via a Vehicle-to-Network (V2N) 126 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
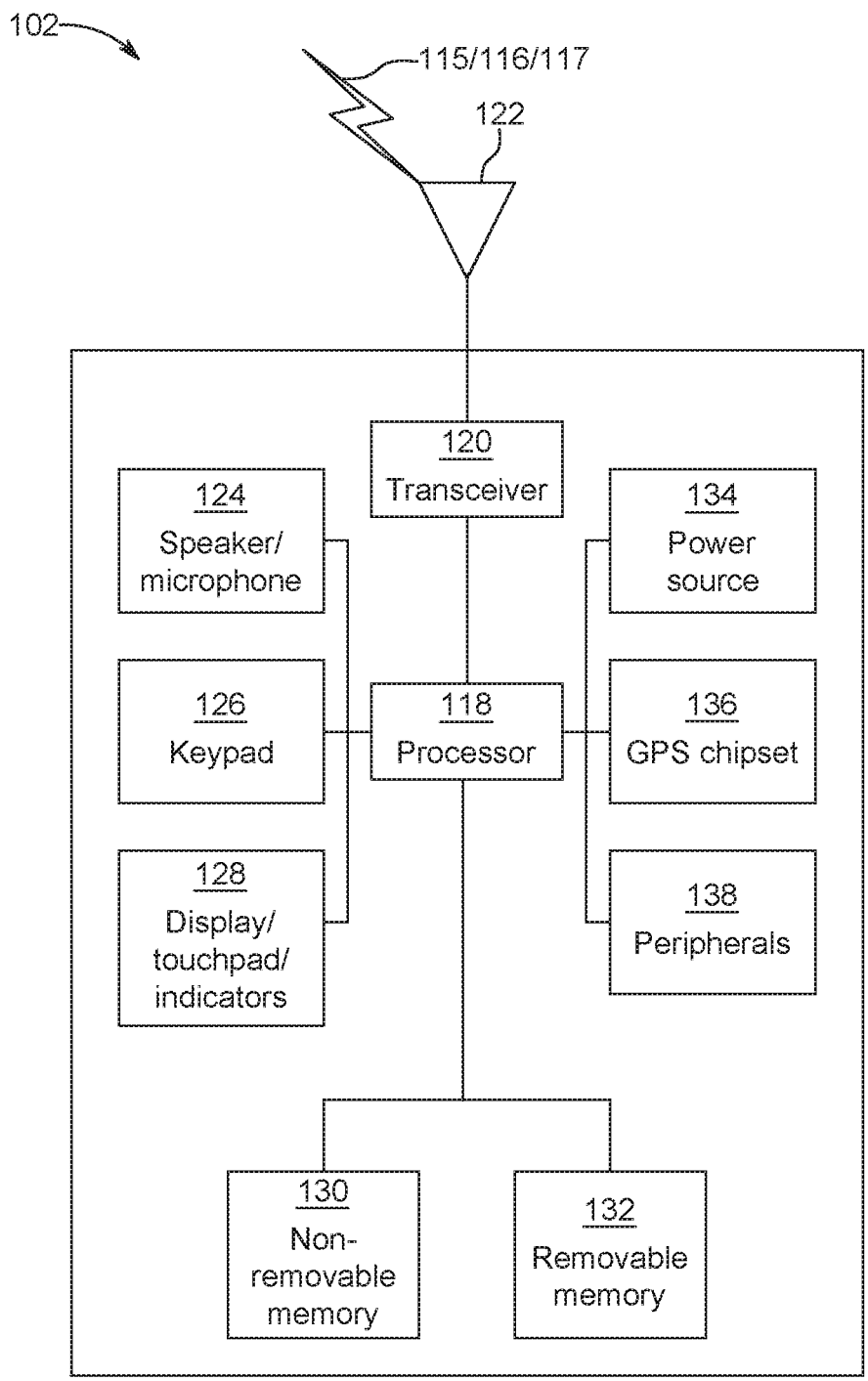
FIG. 1F is a system diagram of an example apparatus or device configured for wireless communications.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/ indicators 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/ receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/ receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
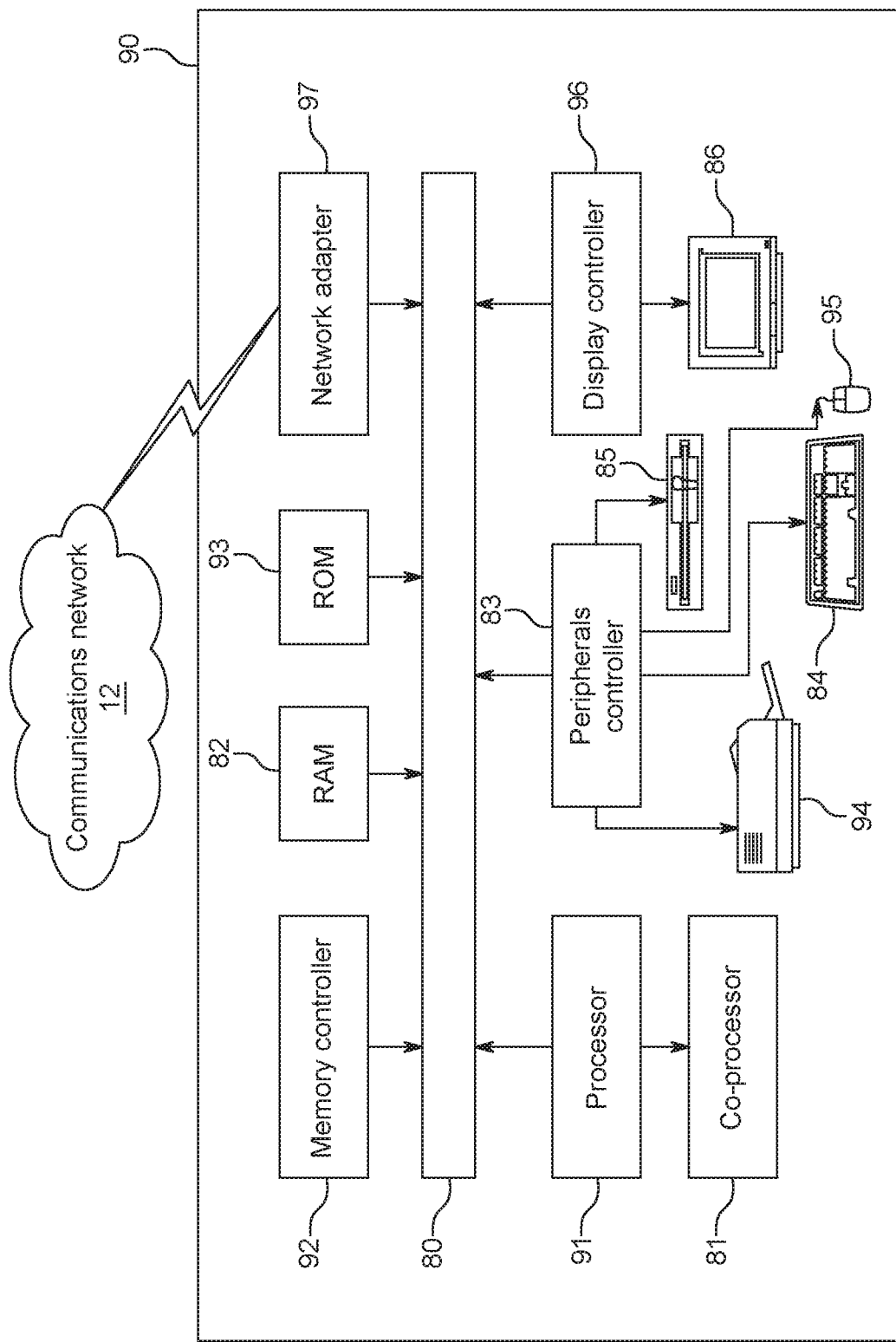
FIG. 1G is a system diagram that shows an example of a computing system used in a communication network.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108. Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

NR Power Saving

Figure 2A:
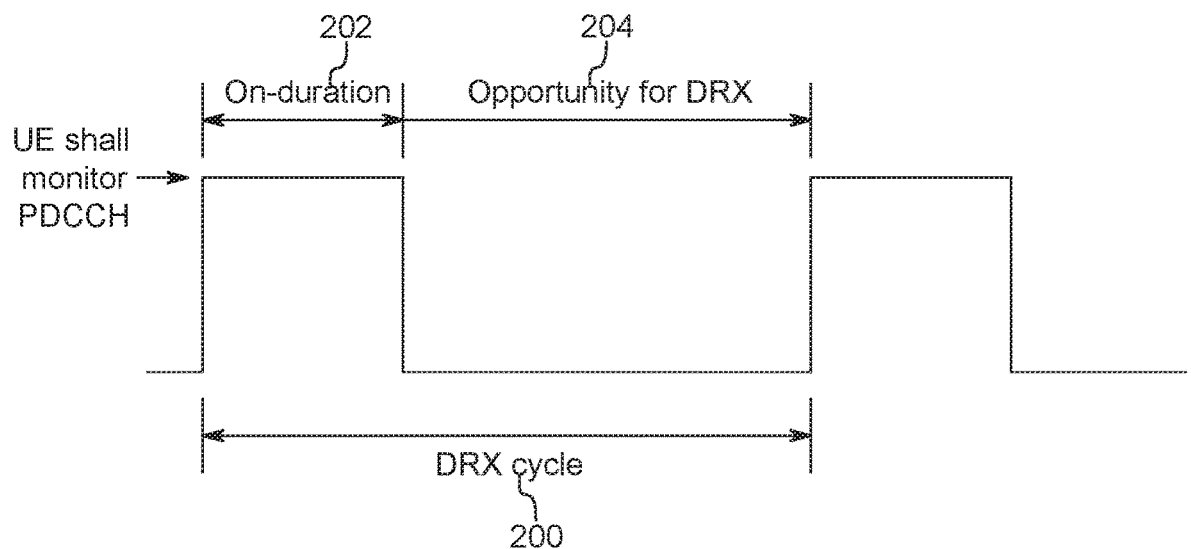
FIG. 2A shows a DRX cycle that specifies a periodic repetition of the on-duration followed by a possible period of inactivity in accordance with an exemplary embodiment.

The following section describes NR power savings generally as it relates to UEs. The PDCCH monitoring activity of the UE in RRC connected mode is governed by Discontinuous Reception (DRX) and Bandwidth Adaption (BA). When DRX is configured, the UE does not have to continuously monitor PDCCH. DRX is characterized by the following (see 3GPP TS 38.300, NR; NR and NG-RAN Overall Description; Stage 2 (Release 15), V15.4.0, the contents of which are incorporated herein by reference in their entirety):

- on-duration 202: duration that the UE 300 waits for, after waking up, to receive PDCCHs. If the UE successfully decodes a PDCCH, the UE stays awake and starts the inactivity timer;
- inactivity-timer: duration that the UE waits to successfully decode a PDCCH, from the last successful decoding of a PDCCH, failing which it can go back to sleep. The UE can restart the inactivity timer following a single successful decoding of a PDCCH for a first transmission only (i.e. not for retransmissions);
- retransmission-timer: duration until a retransmission can be expected;
- cycle: specifies the periodic repetition of the on-duration followed by a possible period of inactivity (see FIG. 2A, 200);
- active-time: total duration that the UE monitors PDCCH. This includes the "on-duration" of the DRX cycle 204, the time UE is performing continuous reception while the inactivity timer has not expired, and the time when the UE is performing continuous reception while waiting for a retransmission opportunity.

When BA is configured, the UE 300 only has to monitor PDCCH on the one active Bandwidth Part (BWP) (i.e. it does not have to monitor PDCCH on the entire DL frequency of the cell). A BWP inactivity timer (independent from the DRX inactivity-timer described above) is used to switch the active BWP to the default one: the timer is restarted upon successful PDCCH decoding and the switch to the default BWP takes place when it expires.

DRX-Config IE

The IE DRX-Config is used to configure DRX related parameters. See 3GPP TS 38.331, Radio Resource Control (RRC) protocol specification (Release 15), V15.4.1, the contents of which are incorporated herein by reference in their entirety.

DRX-Config Information Element

```
-- ASN1START
-- TAG-DRX-CONFIG-START
DRX-Config ::=              SEQUENCE {
    drx-onDurationTimer         CHOICE {
                              subMilliSeconds INTEGER (1..31),
                              milliSeconds  ENUMERATED {
                                  ms1, ms2, ms3, ms4, ms5, ms6, ms8, ms10, ms20, ms30, ms40,
                                  ms50, ms60, ms80, ms100, ms200, ms300, ms400, ms500, ms600,
                                  ms800, ms1000, ms1200, ms1600, spare8, spare7, spare6, spare5,
                                  spare4, spare3, spare2, spare1 }
                              },
    drx-InactivityTimer         ENUMERATED {
                              ms0, ms1, ms2, ms3, ms4, ms5, ms6, ms8, ms10, ms20, ms30, ms40,
                              ms50, ms60, ms80, ms100, ms200, ms300, ms500, ms750, ms1280,
                              ms1920, ms2560, spare9, spare8, spare7, spare6, spare5, spare4,
                              spare3, spare2, spare1},
    drx-HARQ-RTT-TimerDL              INTEGER (0..56),
    drx-HARQ-RTT-TimerUL              INTEGER (0..56),
    drx-RetransmissionTimerDL         ENUMERATED {
                              sl0, sl1, sl2, sl4, sl6, sl8, sl16, sl24, sl33, sl40, sl64, sl80, sl96, sl112,
                              sl128, sl160, sl320, spare15, spare14, spare13, spare12, spare11,
                              spare10, spare9, spare8, spare7, spare6, spare5, spare4, spare3,
                              spare2, spare1},
    drx-RetransmissionTimerUL         ENUMERATED {
                              sl0, sl1, sl2, sl4, sl6, sl8, sl16, sl24, sl33, sl40, sl64, sl80, sl96, sl112,
                              sl128, sl160, sl320, spare15, spare14, spare13, spare12, spare11,
```

```
                              spare10, spare9, spare8, spare7, spare6, spare5, spare4, spare3,
                              spare2, spare1 },
    drx-LongCycleStartOffset              CHOICE {
      ms10                      INTEGER(0..9),
      ms20                      INTEGER(0..19),
      ms32                      INTEGER(0..31),
      ms40                      INTEGER(0..39),
      ms60                      INTEGER(0..59),
      ms64                      INTEGER(0..63),
      ms70                      INTEGER(0..69),
      ms80                      INTEGER(0..79),
      ms128                      INTEGER(0..127),
      ms160                      INTEGER(0..159),
      ms256                      INTEGER(0..255),
      ms320                      INTEGER(0..319),
      ms512                      INTEGER(0..511),
      ms640                      INTEGER(0..639),
      ms1024                     INTEGER(0..1023),
      ms1280                     INTEGER(0..1279),
      ms2048                     INTEGER(0..2047),
      ms2560                     INTEGER(0..2559),
      ms5120                     INTEGER(0..5119),
      ms10240                     INTEGER(0..10239)
    },
    shortDRX                  SEQUENCE {
      drx-ShortCycle          ENUMERATED {
                              ms2, ms3, ms4, ms5, ms6, ms7, ms8, ms10, ms14, ms16, ms20,
                              ms30, ms32, ms35, ms40, ms64, ms80, ms128, ms160, ms256,
                              ms320, ms512, ms640, spare9, spare8, spare7, spare6, spare5,
                              spare4, spare3, spare2, spare1 },
      drx-ShortCycleTimer     INTEGER (1..16)
    }                                  OPTIONAL,   -- Need R
    drx-SlotOffset            INTEGER (0..31)
}
-- TAG-DRX-CONFIG-STOP
-- ASN1STOP
```

TABLE 1

DRX-Config field descriptions

| Field | Description |
|---|---|
| drx-HARQ-RTT-TimerDL | Value in number of symbols of the BWP where the transport block was received. |
| drx-HARQ-RTT-TimerUL | Value in number of symbols of the BWP where the transport block was transmitted. |
| drx-InactivityTimer | Value in multiple integers of 1 ms. ms0 corresponds to 0, ms1 corresponds to 1 ms, ms2 corresponds to 2 ms, and so on. |
| drx-LongCycleStartOffset | drx-LongCycle in ms and drx-StartOffset in multiples of 1 ms. If drx-ShortCycle is configured, the value of drx-LongCycle shall be a multiple of the drx-ShortCycle value. |
| drx-onDurationTimer | Value in multiples of 1/32 ms (subMilliSeconds) or in ms (milliSecond). For the latter, ms1 corresponds to 1 ms, ms2 corresponds to 2 ms, and so on. |
| drx-RetransmissionTimerDL | Value in number of slot lengths of the BWP where the transport block was received. sl0 corresponds to 0 slots, sl1 corresponds to 1 slot, sl2 corresponds to 2 slots, and so on. |
| drx-RetransmissionTimerUL | Value in number of slot lengths of the BWP where the transport block was transmitted. sl0 corresponds to 0 slots, sl1 corresponds to 1 slot, sl2 corresponds to 2 slots, and so on. |
| drx-ShortCycleTimer | Value in multiples of drx-ShortCycle. A value of 1 corresponds to drx-ShortCycle, a value of 2 corresponds to 2 * drx-ShortCycle and so on. |
| drx-ShortCycle | Value in ms. ms1 corresponds to 1 ms, ms2 corresponds to 2 ms, and so on. |
| drx-SlotOffset | Value in 1/32 ms. Value 0 corresponds to 0 ms. value 1 corresponds to 1/32 ms, value 2 corresponds to 2/32 ms, and so on. |

NR Bandwidth Adaption

NR Bandwidth Adaption: Layer 2

With BA, the receive and transmit bandwidth of a UE need not be as large as the bandwidth of the cell and can be adjusted: the width can be ordered to change (e.g. to shrink during a period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and indicating to the UE which of the configured BWPs is currently the active one. See 3GPP TS 38.300, NR; NR and NG-RAN Overall Description; Stage 2 (Release 15), V15.4.0, the contents of which are incorporated herein by reference in their entirety.

Figure 2B:
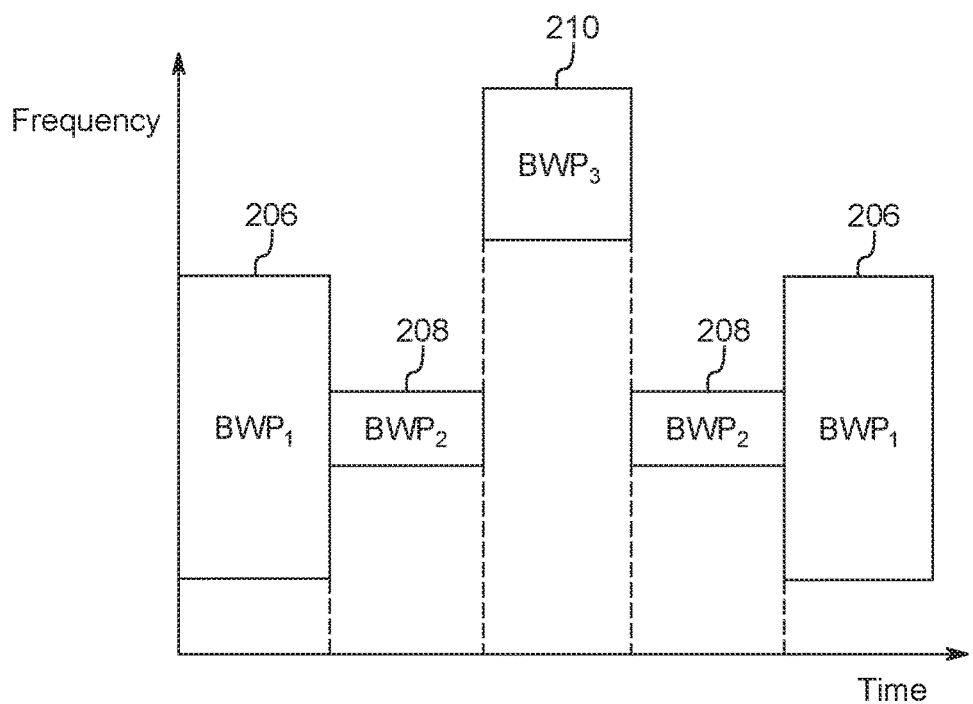
FIG. 2B is a graph showing configuration a UE with 3 BWPs in accordance with an exemplary embodiment.
Figure 3:
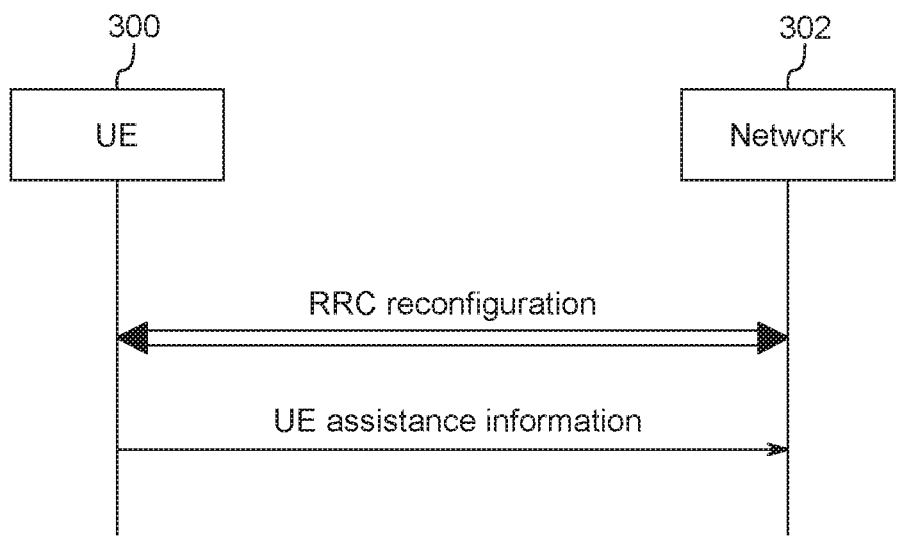
FIG. 3. is a graph showing messaging traffic between a UE and Network for UE assistance information in accordance with an exemplary embodiment.

FIG. 2B describes a scenario where 3 different BWPs 206, 208, 210 are configured:
- $BWP_1$ 206 with a width of 40 MHz and subcarrier spacing of 15 kHz;
- $BWP_2$ 208 with a width of 10 MHz and subcarrier spacing of 15 kHz; and
- $BWP_3$ 210 with a width of 20 MHz and subcarrier spacing of 60 kHz.

A Serving Cell may be configured with one or multiple BWPs, and the maximum number of BWP per Serving Cell is specified in 3GPP TS 38.213, NR; Physical Layer Procedures for Control (Release 15), V15.4.0, the entire contents of which are incorporated by reference herein in their entirety.

The BWP switching for a Serving Cell is used to activate an inactive BWP and deactivate an active BWP at a time. The BWP switching is indicated by a scheduling Downlink Control Information (DCI) for a downlink assignment or an uplink grant, by the bwp-InactivityTimer, by RRC signalling, or by the MAC entity itself upon initiation of Random Access procedure. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively (as specified in 3GPP TS 38.331, Radio Resource Control (RRC) protocol specification (Release 15), V15.4.1) is active without receiving PDCCH indicating a downlink assignment or an uplink grant. The active BWP for a Serving Cell is indicated by either RRC or PDCCH (as specified in 3GPP TS 38.213, NR; Physical Layer Procedures for Control (Release 15), V15.4.0). For unpaired spectrum, a DL BWP is paired with a UL BWP, and BWP switching is common for both UL and DL.

NR Bandwidth Adaption: RRC

To enable BA on the PCell, the gNB configures the UE with UL and DL BWP(s). To enable BA on SCells in case of CA, the gNB configures the UE with DL BWP(s) at least (i.e. there may be none in the UL). For the PCell, the initial BWP is the BWP used for initial access. For the SCell(s), the initial BWP is the BWP configured for the UE to first operate at SCell activation. See 3GPP TS 38.331, Radio Resource Control (RRC) protocol specification (Release 15), V15.4.1.

In paired spectrum, DL and UL can switch BWP independently. In unpaired spectrum, DL and UL switch BWP simultaneously. Switching between configured BWPs happens by means of RRC signalling, DCI, inactivity timer or upon initiation of random access. When an inactivity timer is configured for a serving cell, the expiry of the inactivity timer associated to that cell switches the active BWP to a default BWP configured by the network. There can be at most one active BWP per cell, except when the serving cell is configured with SUL, in which case there can be at most one on each UL carrier.

UE Assistance Information

The purpose of this procedure is to inform the network 302 of the UE's 300 delay budget report carrying desired increment/decrement in the Uu air interface delay, connected mode DRX cycle length or overheating assistance information. 3GPP TS 38.331, Radio Resource Control (RRC) protocol specification (Release 15), V15.4.1.

Issues Addressed by the Embodiments

UE power savings in RRC_CONNECTED can be achieved by reducing the PDCCH monitoring occasions and/or RRM measurements. Ensuring a UE is configured with a suitable BWP when it is monitoring the PDCCH or performing RRM measurements is also critical to minimizing the UE power consumption. An NR UE may support a diverse set of services (e.g. voice, gaming, instant messaging, V2X) with different traffic characteristics and QoS requirements. The existing power savings mechanisms defined for NR; (e.g. DRX, BWP operation) cannot adapt to the changing traffic patterns quickly enough to optimize the power consumption while at the same time minimize the negative impacts on latency and User Perceived Throughput (UPT).

For example, in the case of C-DRX, a single configuration is provided by the network via RRC signaling to control the UE's PDCCH monitoring activity. This semi-static configuration of C-DRX may not be able to adapt to the changing traffic patterns quickly and efficiently. The details of how a power saving signal/channel can be used to adapt the C-DRX procedure have not yet been agreed to in the scientific community. During the R16 SI on UE power savings, it was agreed that a power saving signal/channel that can be used to adapt the PDCCH monitoring activity to the changing traffic patterns more quickly should be studied. More specifically, 3GPP Working Group RAN2 has agreed that the PDCCH-based power saving signal/channel scheme for wake-up purpose is considered jointly with DRX and is only configured when DRX is configured. If the PDCCH-based power saving signal/channel for wake-up purpose is not configured, the legacy DRX operation applies. Therefore, as recognized by the present inventors, there is a need to define enhancements to the C-DRX procedure to make use of the power saving signal/channel described herein to adapt the UE's PDCCH monitoring activity.

As discussed previously herein, ensuring a UE is configured with a suitable BWP when it is monitoring the PDCCH or performing RRM measurements is also relevant to minimizing the UE power consumption. However, for NR, C-DRX and BWP operation are specified independently from the MAC perspective. This can result in the UE having an unsuitable BWP when transitioning to a different C-DRX state, which would require the network to send DCI to switch to a suitable BWP. This can result in additional latency and UE power consumption. Therefore, as recognized by the present inventors, there is a need to define new mechanisms to ensure a UE is switched to suitable BWP when transitioning to a different C-DRX state. Additionally, it is recognized by the present inventors the need to define new procedures for skipping of PDCCH monitoring occasions for example DCI-based PDCCH monitoring skipping to achieve PDCCH monitoring/decoding reduction. If enabled, DCI-based PDCCH monitoring skipping can be configured with or without DRX.

Furthermore, when configured for Carrier Aggregation, an NR UE monitors the PDCCH on the PCell and the activated SCells during the Active Time. The traffic on the SCell is typically less than that which is carried on the PCell, since the SCell is primarily used when high throughput is required. The network can use a MAC CE to deactivate an SCell when it is not being used, but the SCell deactivation timer is typically used instead. This results in unnecessary monitoring of the PDCCH on the SCell(s) which increases the UE power consumption. Therefore, as recognized by the present inventors, there is a need for new mechanisms to reduce the PDCCH monitoring activity on activated SCells that are not being used for data transmissions in either DL or UL, as well as for cross-carrier scheduling cases.

Although the discussion in 3GPP on PDCCH-based power saving signal/channel scheme has mostly focus on the use of the PDCCH-based power saving signal/channel as a means to get the UE to say awake or to wake up, the power saving signal/channel can also be used to indicate to the UE to not wake up or to go to sleep. In the remaining portion of this disclosure, the term WUS (Wake UP Signal) will be used to denote the PDCCH-based power saving signal/channel used to command the UE to wake up or to stay awake. Similarly, the term GTS (Go To Sleep) will be used to denote the PDCCH-based power saving signal/channel used to command the UE to go to sleep or to not wake up. It is understood that both WUS and GTS may be realized by the same PDCCH-based power saving signal/channel, but the payload will indicate whether the signal is in fact a WUS signal/channel or a GTS signal/channel.

As the Power Saving signal/channel may have a payload that could command the UE as WUS signal or as a GTS signal, the present inventors recognize that a mis-detection may include one of the following possibilities: a) a WUS command is mis-detected as a GTS; b) a GTS command is mis-detected as a WUS command; c) the UE fails to comprehend the power saving command from the controlling entity or the network, for example as a result of failure to receive or properly decode the signal/channel. One likely specification direction which could be considered as a baseline design consideration is to assume a UE behavior when a WUS is mis-detected as a GTS would be the same as when a UE correctly received a GTS signal/channel, as the UE would have no way of knowing at the time of the reception of the signal, that the command carried by the signal is mis-detected. Similarly, a UE behavior when a GTS is mis-detected as a WUS would be same as when the UE correctly received a WUS signal/channel.

As a result, and in addition to the problems described above, the present disclosure considers the following WUS or GTS reception or monitoring specific problems regardless of mis-detection.

Issue Regarding WUS 1

One issue is the UE handling of interaction between the WUS command from network and MAC procedures (e.g. RA, SR and BSR) or any other event part of legacy active time DRX (e.g. On Duration, DRX Inactivity) and related timers. Depending on operation of MAC procedures, it may be inappropriate for the WUS procedure to disable reception. Therefore, the present disclosure promotes the incorporation of coordination between MAC procedures and the PHY WUS operation procedure.

Issue Regarding WUS 2

Another issue is the UE's handling of collision of monitoring of WUS with any UL triggered activities (e.g. RA, SR and BSR) or any other event part of legacy active time DRX (e.g. On Duration, DRX Inactivity, etc.). For example, option (1) UE does not monitor WUS while UE is in legacy active time, or option (2) UE monitors WUS while UE is in legacy active time. If UE monitors the WUS and there is a switching time, a question arises regarding whether the UE can still receive reference signals, PDCCH, etc. If the UE does not monitor WUS, another question arises regarding whether the UE received the WUS command or if there are different actions.

Issue Regarding GTS 1

A further issue relates to the UE's handling of interaction between the GTS command from network and MAC procedures (e.g. RA, SR and BSR) or any other event part of legacy active time DRX (e.g. On Duration, DRX Inactivity) and related timers. Depending on operation of MAC procedures, it may be inappropriate for the GTS procedure to disable reception. Therefore, as recognized by the present inventors, there should be coordination between MAC procedures and the PHY GTS operation procedure.

Issue Regarding GTS 2

A further issue relates to the UE's handling of collision of monitoring of GTS with any UL triggered activities (e.g. RA, SR and BSR) or any other event part of legacy active time DRX (e.g. On Duration, DRX Inactivity). For example, there are alternative options such as option (1) UE does not monitor GTS while UE is in legacy active time, or option (2) UE monitors GTS while UE is in legacy active time. If the UE monitors GTS and there is a switching time, a question arises regarding whether the UE can still receive reference signals, PDCCH, etc. If the UE does not monitor GTS, another issue arises regarding whether the UE received the GTS command or are there different actions.

Optimization for Power Saving Signal Mis-Detection—Problem PwrSS-MD

A Power Saving signal/channel may be designed to indicate WUS only, and for example may not have a payload. The present disclosure refers to such power saving signal/channel as WUS-only power saving signal/channel. A mis-detection of WUS-only power saving signal/channel means the UE fails to comprehend the power saving command from the controlling entity or the network, for example as a result of failure to receive or properly decode the signal/channel. The WUS or GTS may be mis-detected. This misdetection may result in mis-interpretation where the UE may incorrectly enable or disable the subsequent DRX On Duration. Additional UE behaviors may be specified, for example for the detection of mis-detection and the UE actions once mis-detection is detected.

Similarly, a Power Saving signal/channel may be designed to indicate GTS only, and for example may not have a payload. The present disclosure refers to such power saving signal/channel as GTS-only power saving signal/channel. A mis-detection of GTS-only power saving signal/channel means the UE fails to comprehend the power saving command from the controlling entity or the network, for example as a result of failure to receive or properly decode the signal/channel. This misdetection may result in mis-interpretation where the UE may incorrectly enable or disable the subsequent DRX On Duration. Additional UE behaviors may be specified, for example for the detection of mis-detection and the UE actions once mis-detection is detected.

Similarly, a Power Saving signal/channel may be designed to indicate WUS or GTS. Mis-detection may also happen in this case, and such mis-detection may result in mis-interpretation where the UE may incorrectly enable or disable the subsequent DRX On Duration.

Issues Related to PDCCH Skipping

Considering DCI-based PDCCH monitoring skipping and drawing on the similarity with the use of power saving signal/channel, the following PDCCH skipping (PSk) specific issues may be considered.

PSk 1

It has been agreed that PDCCH skipping is transparent to operation of the MAC DRX procedure. This then implies the PHY PDCCH skipping procedure is not transparent to the MAC DRX procedure. The issue is similar for other MAC procedures (e.g. RA, SR, HARQ, BSR . . . ). The UE handling of interaction between PDCCH skipping command from network and UL triggered activities (e.g. RA, SR and BSR) or any other event part of legacy active time DRX (e.g. On Duration, DRX Inactivity) and related timers gives rise to the questions of when/how/where to ignore PDCCH skipping and when/where/how this is done. For example, whether it is handled in the MAC or in the PHY.

PSk2

Assuming the design of the monitoring of PDCCH skipping by the UE may involve potential collision with UL triggered activities (e.g. RA, SR and BSR) or events part of legacy active time DRX (e.g. On Duration, DRX Inactivity), then similar to the power saving signal case, the UE handling of collision of monitoring of PDCCH skipping with any UL triggered activities (e.g. RA, SR and BSR) or any other event part of legacy active time DRX (e.g. On Duration, DRX Inactivity) should be investigated. For example, at least two options include option (1) UE does not monitor PDCCH skipping while UE is in legacy active time, or option (2) UE monitors PDCCH skipping while UE is in legacy active time. If the UE monitors PDCCH skipping and there is a switching time, it is not clear if the UE can still receive reference signals, PDCCH, etc. For example, an ambiguity arises if the UE does not monitor PDCCH skipping, is this just as if the UE received the PDCCH skipping command or are there different actions.

UE Assistance Information

In order to address each of the UE PDCCH monitoring reduction issues described above, the UE may provide assistance information to the network in order to assist the network in selecting a power saving scheme (for e.g. WUS. GTS, PDCCH skipping, PDCCH monitoring duty cycle on PCell or SCell, etc.) and the appropriate configuration parameters of power saving schemes. Such assistance information and the triggers for providing such information to the network should be investigated.

Overview

In this disclosure, at least the following solutions are discussed regarding how to adapt the PDCCH monitoring activity of a UE to the changing traffic patterns and reduce the UE's power consumption:

Methods to perform dynamic skipping of the DRX on-duration for scenarios where DL traffic is not transmitted during some DRX cycles.

Methods to perform adaption of one or more DRX parameters to match the DRX behavior to the DL traffic pattern.

Methods to perform dynamic switching of the active DRX configuration from a plurality of candidate configurations provided by the network.

Methods to use a power savings signal/channel to trigger an aperiodic DRX cycle.

Methods to perform DRX for a UE configured for Carrier Aggregation, where the UE maintains independent Active Time for each Serving Cell.

Methods to dynamically reconfigure the cross-carrier scheduling configuration to reduce the PDCCH monitoring occasions on the SCells for a UE configured for Carrier Aggregation.

Methods for coordination between the DRX and BWP operation procedures to ensure a UE remains configured with a suitable BWP during the active-time.

Power Saving Signal Reception (WUS and/or GTS signal) Procedures.

Power Saving Signal (WUS and/or GTS signal) Misinterpretation Procedures.

Coordination of Explicit PDCCH Skipping Command and MAC Procedures.

Methods PDCCH Monitoring Reduction and efficient use of UL resources through consolidation of UL transmission.

UE Assistance Information.

Methods for PDCCH Monitoring Reduction with No DRX Configuration.

Power Savings Effect on MAC

Adapting the PDCCH monitoring activity to the changing traffic patterns can significantly reduce the UEs power consumption. There is a number of ways to achieve this. One way to accomplish this is DRX Adaptation. DRX adaptation may include one of more of the following schemes: a) adaptation of the active time through variation of PDCCH monitoring duty cycle while keeping unchanged the DRX configurations parameters, i.e. the parameters configured into the MAC by RRC for the control of DRX operation; b) adaptation of the DRX configuration parameters; c) DRX Adaptation with the network forcing the UE into sleep or forcing the UE to wake up or remain awake. The DRX adaptation assumes a power saving scheme where the UE is configured to operate DRX procedure and therefore built on top of DRX procedure. The DRX adaptation in the UE may be based on explicit signaling from the base station, implicit signaling from the base station or may be autonomously done by the UE. For example, the DRX adaptation by way of adaptation of the active time through variation of PDCCH monitoring duty cycle may be accomplished by UE autonomously adjusting its active time for e.g. using predefined rules. Such rules may be captured in the specification or known to the UE through provisioning or pre-configuration. Considering the scheme of the network forcing the UE into sleep or forcing the UE to wake up or remain awake, the network (e.g. base station) may force UE into sleep or may force the UE to wake up or remain awake either explicitly using an explicit signaling, or implicitly using some form of implicit signaling. Yet, another way to reduce PDCCH monitoring is to tie Scheduling Request (SR) signaling or Buffer Status Report (BSR) signaling or related RACH procedure initiation to traffic pattern or traffic type. For example, SR resources may be associated with traffic pattern or traffic type. The UE transmits SR on SR resources associated with the pattern or the type of the traffic that triggers the SR. The base station knows from the resources over which an SR is received, the traffic pattern or traffic type that triggers the SR and assigned resources accordingly, so as to minimize the need for PDCCH monitoring in the UE. In another alternative, the SR may signal one or more bits that can be used to indicate the traffic type. From the resource grant, the UE may learn the PDCCH monitoring pattern and when the UE is required to monitor PDCCH. And in yet another approach different SR resources could be linked with different PDCCH monitoring patterns, such that a UE would autonomously select a certain PDCCH monitoring pattern based on which SR (i.e. traffic type/pattern) it selected. Considering the scheme of DRX adaptation through adaptation of the DRX configuration parameters, the signaling may be RRC signaling based, MAC signaling based for example MAC CE specifically specified for DRX adaptation through adaptation of the DRX configuration parameters, or PHY DCI signaling. Furthermore, any of the DRX adaptation schemes described herein may be applied.

Another way to reduce UE power consumption is through PDCCH monitoring duty cycle adaptation independent of DRX configuration, such that with this scheme, PDCCH monitoring duty cycle is adapted or adjusted over time even if the UE is not configured for DRX operation. The PDCCH monitoring adaptation may be based on explicit signaling from the base station, implicit signaling from the base station or may be autonomously done by the UE and may be based on predefined rules or tie to a traffic pattern as described above.

Power Savings Effect on MAC—PDCCH Monitoring Reduction Through DRX Adaptation

Power Savings Effect on MAC—PDCCH Monitoring Reduction Through DRX Adaptation—Explicit Signaling Based DRX Configuration Parameters Adaption In explicit signaling based DRX adaption, a UE is assumed to have a DRX configuration that is adapted by explicit signaling transmitted by the network. The DRX configuration may be provided to the UE via higher layer signaling; e.g. RRC, and may be based on the DRX-Config IE described herein. The explicit signaling transmitted by the network to adapt the DRX configuration may performed by the RRC (e.g. RRC message), MAC (e.g. MAC CE) or PHY (e.g. DCI).

In a first exemplary embodiment, a complete DRX configuration is signaled by the network to perform the adaption. The complete DRX configuration used to perform the adaption may be provided via RRC signaling and/or a MAC CE and/or DCI.

In a second exemplary embodiment, a plurality of complete DRX configurations are first provided by the network, and the network may then activate a desired configuration at any given time. RRC signaling may be used to provide the plurality of DRX configurations, and the activation may be performed using RRC signaling, a MAC CE and/or DCI.

In a third exemplary embodiment, a subset of the DRX configuration parameters; e.g. drx-onDurationTimer, drx-InactivityTimer, are signaled by the network to perform the adaption. The DRX configuration parameter(s) used to perform the adaption may be provided via RRC signaling, a MAC CE and/or DCI.

In a fourth exemplary embodiment, a scaling parameter may be used to scale the values of one or more DRX parameters. The scaling parameter may be provided dynamically using a MAC CE or DCI. The parameters to which the scaling applies may be defined per the specification or known to the UE through provisioning or pre-configuration.

Power Savings Effect on MAC—PDCCH Monitoring Reduction Through DRX Adaptation—UE Autonomous or Implicit Signaling Based DRX Configuration Parameters Adaptation In autonomous or implicit signaling based DRX adaption, a UE is assumed to have a DRX configuration that is adapted either autonomously by the UE or based on implicit signaling transmitted by the network. The DRX adaptation may be accomplished in the framework of one DRX configuration parameter set per cell group (or cell) or in the framework of two or more DRX configuration parameter sets per cell group (or cell).

In a first exemplary embodiment, a plurality of complete DRX configurations are first provided by the network, and a rules-based mechanism is then used to activate a desired configuration. The rules may be based on traffic pattern or traffic type.

In a second exemplary embodiment, a single complete DRX configuration is provided by the network, and a rules-based mechanism such as traffic pattern or traffic type rule based is then used to adapt the DRX active time. In one exemplary embodiment, the UE may adapt the active time while keeping the starting point in time of the DRX cycle deterministic and known to both the UE and the base station. For example, the UE may adapt the active time by doing one or more of the following: shorten the DRX inactive time, extend the DRX inactive timer, sleeps between control resource occurrences, sleeps at the end of ON-duration and delay the start of DRX inactive timer, shorten the on-duration timer possibly setting the value to zero to skip DRX cycle, extend on-duration timer. In yet another exemplary embodiment, the UE may adapt the active time not only with adjustments to on-duration timer or inactive timer but also the UE may adapt the active time by adapting for example the DRX cycle including shifting the starting time instants of DRX cycle. For example, the UE may switch between a plurality of DRX cycles configured into the UE either autonomously or upon detection of an implicit DRX adaption indication by the base station, for e.g. the UE may switch between short or long DRX cycles. In a third exemplary embodiment, a single complete DRX configuration is provided by the network, and a rules-based mechanism is then used by the UE to autonomously decide when to enter DRX and how long to remain in DRX, effectively adapting the drx-ShortCycle, drx-LongCycle and/or drx-StartOffset parameters. Information such as DL assignments and/or UL grants signaled via DCI may be used by the UE to perform the adaption.

Power Savings Effect on MAC—PDCCH Monitoring Reduction Through DRX Adaptation—DRX Adaptation Based on Adaptation of PDCCH Monitoring Duty Cycle (PDCCH Skipping with DRX)

Similarly, information such as CORESET or CORESET pattern to be used (for e.g. from a set of preconfigured CORESET or CORESET pattern), may be used by the UE to perform DRX adaptation. The UE may learn such information, from the grant assignment as an implicit indication form the base station or based on rules configured into the UE or specified in the specifications.

Power Savings Effect on MAC—PDCCH Monitoring Reduction Through DRX Adaptation—PDCCH Monitoring Reduction Based on Power Saving Signal or Channel Assuming DRX (WUS Based Solutions with DRX)

PDCCH monitoring reduction based on the power savings signal/channel can also be used in combination with DRX. One way this can be accomplished is by using the power savings signal/channel to adapt the DRX behavior to match the traffic pattern; e.g. skipping one or more DRX on-duration, reducing/extending one or more DRX timer durations, etc.

Figure 4A:
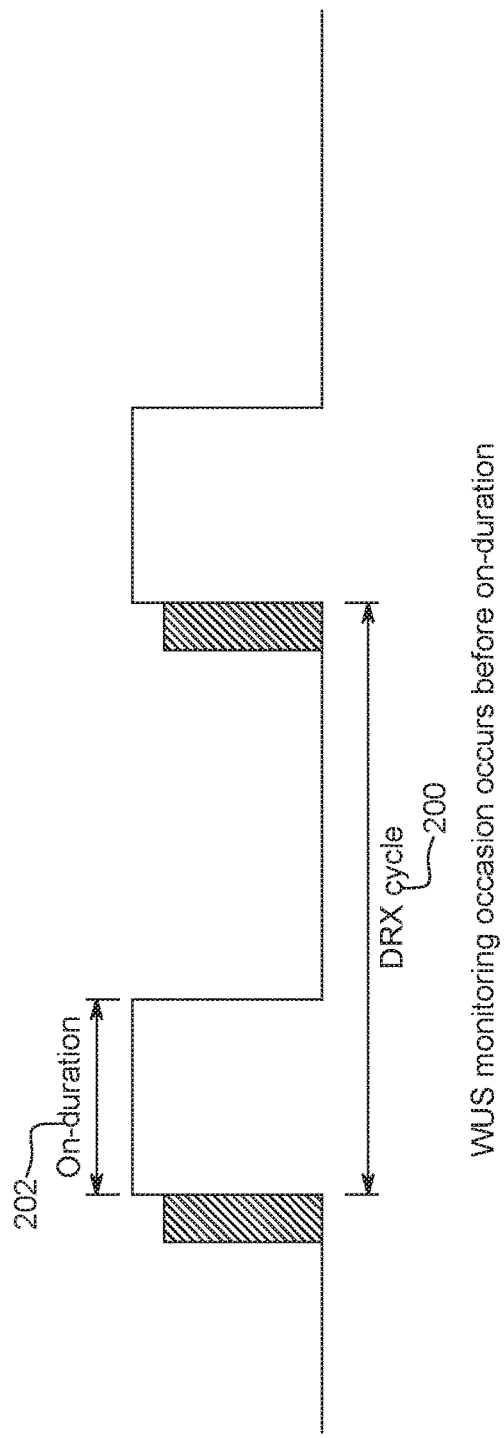
FIGS. 4A and 4B are graph showing different associations between WUS monitoring occasions and a DRX cycle as shown in FIG. 2A in accordance with an exemplary embodiment.
Figure 4B:
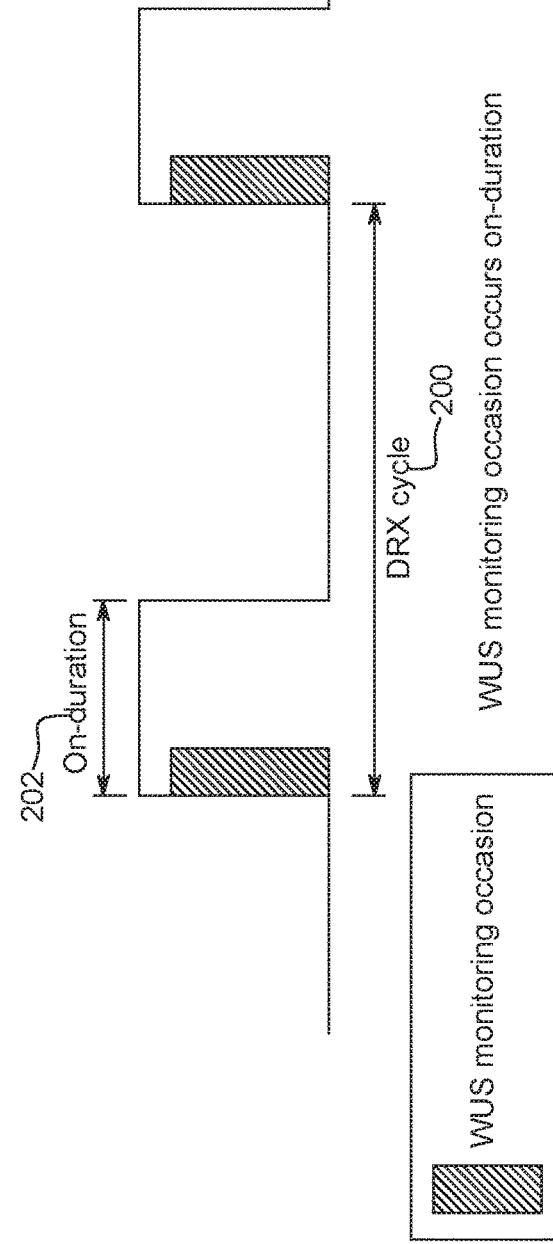

For PHY based signaling, a UE may be configured with monitoring occasions that are associated with the DRX configuration, where the monitoring occasions may be dedicated with DRX-related signals or shared with other signals/channels such as PDCCH. For example, a UE may be configured with monitoring occasions for the WUS that occur before or at the beginning of the DRX on-duration 202 as shown in FIGS. 4A and 4B. In this illustration, the WUS is shown without a gap between start/end of the WUS and the on-duration. However, a gap may be configured in some configurations; e.g. to allow time to retune to a different bandwidth and/or frequency. The WUS monitoring occasions may be configured via higher layer signaling; e.g. RRC. The location of the WUS monitoring occasions may be configured in an absolute sense or as an offset relative to the start of the on-duration. The signaling carried via the WUS may be associated with one or more DRX cycles 200.

A PDCCH-based WUS may be used to signal DCI that is used to adapt the UE DRX behavior.

Fields that may be included in an exemplary DCI format that may be used to indicate if PDCCH monitoring should be performed or skipped during the on-duration is shown in Table 2.

TABLE 2

Exemplary Fields Included in a DCI Format Used for On-Duration Skipping

| Field Name | # Bits | Comment |
| --- | --- | --- |
| Skip Indicator | 1 | Flag to indicate if the on-duration should be skipped for the associated DRX cycle(s). |

And for Carrier Aggregation scenarios, an alternate exemplary embodiment where a Skip Indicator is signaled separately for each serving cell may be used. Fields that may be included in an exemplary DCI format where a bit-field is used to signal the Skip Indicators for each Serving Cell is shown in Table 3.

TABLE 3

Exemplary Fields Included in an Alternative DCI Format Used for On-Duration Skipping

| Field Name | # Bits | Comment |
| --- | --- | --- |
| Skip Indicator | 32 | Flag to indicate if the on-duration should be skipped for the associated DRX cycle(s). Bit 0 corresponds to the PCell; bit 1 corresponds to the SCell with SCellIndex 1; bit 2 corresponds to the SCell with SCellIndex 2; and so on. |

Fields that may be included in an exemplary DCI format that may be used to dynamically configure the DRX parameters is shown in Table 4. One or more of the timers may be considered optional, in which case the format field may also be defined to indicate which fields are present. The UE may apply values signaled via the DRX-Config IE for timers whose values are not included in the DCI signaled via the WUS.

Power Savings Effect on MAC—PDCCH Monitoring Reduction Through DRX Adaptation—Monitoring Reduction Based Power Saving Signal or Channel Assuming DRX (WUS or GTS Based Solutions with DRX)—Power Saving Signal Reception (WUS and/or GTS Signal) Procedures As discussed the Power Saving Signal may be used to enter a DRX On Duration or not each DRX cycle. The baseline operation considers the UE is within DRX, the UE is not within Active Time, when the WUS/GTS is received. Upon reception the subsequent DRX cycle is applied or not. One question is what is the procedure when the WUS/GTS occasion occurs when the UE is within DRX Active Time.

In one exemplary embodiment, when within DRX Active Time, the WUS/GTS monitoring occasion is ignored, the UE does not receive the WUS/GTS signal, and the power saving procedure applies logic as if the WUS is received or the GTS is not received. In this case since the gNB knows the UE is within Active Time the gNB may choose not to transmit the WUS/GTS signal. The UE will apply the DRX On Duration at the start of the next DRX cycle, regardless of WUS/GTS reception. This mechanism may be further optimized to not apply the subsequent On Duration if the UE leaves Active Time after the WUS/GTS monitoring occasion and before the start of the next DRX cycle.

In another exemplary embodiment the WUS/GTS may be received within DRX Active Time. In this case WUS/GTS reception may result in loss of PDCCH reception, effectively creating a gap within DRX Active Time. If a WUS is not received, the UE applies a procedure as if a GTS is received regardless of DRX procedure operation. For example, it is possible the DRX Inactivity Timer is running and the period the timer is running eclipse the start of the start of the next DRX cycle. In this case the UE may clear the In Activity timer. Clearing of the timer may be immediate or at the start of the next DRX cycle. Similar behavior may be applied for other MAC procedures that contribute to Active Time (e.g. SR, RA). For example, similar to the Inactivity Timer running, the WUS/GTS may be received by the UE while the Random-Access Contention Resolution Timer (ra-ContentionResolutionTimer), or the Downlink Retransmission

TABLE 4

Exemplary Fields Included in a DCI Format Used to Signal DRX Parameters

| Field Name | # Bits | Comment |
| --- | --- | --- |
| drx-onDurationTimer | 6 | The duration at the beginning of a DRX Cycle where the UE wakes up and monitors the PDCCH. |
| drx-InactivityTimer | 5 | The duration after the PDCCH occasion in which a PDCCH indicates a new UL or DL transmission for the MAC entity. |
| drx-HARQ-RTT-TimerDL | 6 | The minimum duration before a DL assignment for HARQ retransmission is expected by the MAC entity. |
| drx-HARQ-RTT-TimerUL | 6 | The minimum duration before a UL HARQ retransmission grant is expected by the MAC entity. |
| drx-RetransmissionTimerDL | 5 | The maximum duration until a DL retransmission is received. |
| drx-RetransmissionTimerUL | 5 | The maximum duration until a grant for UL retransmission is received. |
| drx-LongCycle | 14 | The Long DRX cycle. |
| drx-StartOffset | 14 | The subframe where the Long and Short DRX Cycle starts. |
| drx-ShortCycle | 5 | The duration the UE shall follow the Short DRX cycle. |
| drx-ShortCycleTimer | 4 | The Short DRX cycle. |
| drx-SlotOffset | 5 | The delay before starting the drx-onDurationTimer. |

Timer (drx-RetransmissionTimerDL) or the Uplink Retransmission Timer (drx-RetransmissionTimerUL) is running and the period the timer is running eclipse the start of the start of the next DRX cycle. In this case, the UE may clear the timer. Clearing of the timer may be immediate or at the start of the next DRX cycle. Similarly, the WUS/GTS may be received by the UE while a Scheduling Request is sent on PUCCH and is pending and the period while the SR is pending eclipse the start of the start of the next DRX cycle. In this case, the UE may cancel all pending SR(s) and each respective Prohibit Timer may be stopped.

The actions taken by the UE at the reception of the Power Saving Signal (WUS or GTS signal) may be dependent upon the received Power Saving signal. In one exemplary embodiment, different DRX configurations (for e.g. DRX On Duration Timer value, DRX Inactivity Timer value, DRX Short Cycle, DRX Short Cycle Timer value, DRX Long Cycle, etc.) may be associated with the Power Saving Signal. The UE may switch to a DRX configuration after the reception of the Power Saving Signal with a DRX configuration that is different from the DRX configuration in use before the reception of the Power Saving Signal. The switch may take effect at the next DRX cycle. In another exemplary embodiment, the UE may learn from the Power Saving signal that the action dictated by the power saving signal shall last more than one DRX cycle. For example, the UE may derive from the received Power Saving Signal that it shall remain awake or wake up and remain awake for more than one DRX cycle. In this case at the reception of Power Saving Signal, the UE shall wake up and remain awake or remain awake according to the number of DRX cycle derived by the UE based on the received Power Saving Signal. Similarly, the UE may derive from the received Power Saving Signal that it shall continue to sleep or go to sleep and continue to sleep for more than one DRX cycle. In this case at the reception of the Power Saving Signal, the UE shall continue to sleep or go to sleep and continue to sleep according to the number of DRX cycle derived by the UE based on the received Power Saving Signal. In yet another exemplary embodiment, the UE may derive from the received Power Saving Signal (WUS or GTS), how long the UE should remain sleep or how long the UE should remain awake within a DRX cycle. One implication of this is within the time frame of a DRX cycle, a Power Saving Signal received while the inactivity timer is running may have the effect of extending the inactivity timer or the effect of shortening the inactivity timer. If the Inactivity Timer is shortened, the UE may clear the In Activity timer. Clearing of the timer may be immediate or at the start of the next DRX cycle. Similarly, if the activity timer is extended, it is possible the DRX In Activity Timer is running and the period the timer is running eclipse the start of the start of the next DRX cycle. In this case the UE may clear the In Activity timer. Clearing of the timer may be immediate or at the start of the next DRX cycle. Similar behavior may be applied for other MAC procedures that contribute to Active Time (e.g. SR, RA). For example, the reception of WUS of GTS by the UE may have the effect of shortening the Random-Access Contention Resolution Timer (ra-ContentionResolutionTimer), or the Downlink Retransmission Timer (drx-RetransmissionTimerDL) or the Uplink Retransmission Timer (drx-RetransmissionTimerUL). Similar to the inactivity timer, if any of these timers is shortened, the UE may clear the timer. Clearing of the timer may be immediate or at the start of the next DRX cycle. Similarly, if any of these timer is extended as result of WUS or GTS procedure, it is possible the timer is running and the period the timer is running eclipse the start of the start of the next DRX cycle. In this case, the UE may clear the timer. Clearing of the timer may be immediate or at the start of the next DRX cycle.

Power Savings Effect on MAC—PDCCH Monitoring Reduction Through DRX Adaptation—Monitoring Reduction Based Power Saving Signal or Channel Assuming DRX (WUS or GTS Based Solutions with DRX)—Power Saving Signal (WUS and/or GTS signal) Misinterpretation Procedures WUS/GTS reception procedures also need to consider when a WUS is interpreted as a GTS, a GTS is interpreted as a WUS, or the transmitted WUS or GTS is not detected by the UE. Depending on the WUS/GTS design, the UE may not be able to detect lost WUS/GTS signals.

In one exemplary embodiment the UE applies logic to determine WUS/GTS misinterpretation. For example, when a WUS is interpreted by the UE and no PDCCH scheduling is received in the subsequent DRX On Duration the UE may consider this a WUS error. Failure of the WUS may not be determined by one missed On Duration scheduling opportunity. Several consecutive failures or a number of failures within a period of time may need to be determined to declare WUS failure. One WUS success, scheduling received at the next On Duration may clear the WUS failure counter.

The UE may indicate the WUS/GTS failure to the network by MAC or RRC signaling. Based on the WUS/GTS failure report the network may configure the WUS/GTS to an alternate resource. Alternatively, the UE may autonomously be preconfigured to an alternate WUS/GTS resource. Another alternative is the UE may disable WUS/GTS operation and continuously enter DRX On Duration each DRX cycle until the WUS/GTS reception is restored.

In another exemplary embodiment there may be special DRX cycles where the UE always applies the DRX On Duration regardless of WUS/GTS operation. This could be a periodic operation occurring after a configured number of DRX cycles. The start of the period would need to be deterministic if the time of the WUS/GTS failure is not known to the network. During the special cycle the network may reassign the WUS/GTS resource or disable WUS/GTS operation.

Power Savings Effect on MAC—PDCCH Monitoring Reduction Through DRX Adaptation—DRX Adaptation Based on Adaptation of PDCCH Monitoring Duty Cycle Power Savings Effect on MAC—PDCCH Monitoring Reduction Through DRX Adaptation—DRX Adaptation Based on Adaptation of PDCCH Monitoring Duty Cycle—PDCCH Monitoring Reduction Through Enhancement to SR, BSR and RACH As described above, SR resources may be associated with a traffic pattern or traffic type. The UE transmits SR on SR resources associated with the pattern or the type of the traffic that triggers the SR. The base station knows from the resources over which an SR is received, the traffic pattern or traffic type that triggers the SR and assigned resources accordingly, so as to minimize the need for PDCCH monitoring in the UE. Similarly, the UE may use the BSR to inform the base station of the traffic pattern or traffic type associated with the buffer being reported to the base station. The linkage between BSR and traffic pattern or traffic type may be achieved through association of logical channel (LCH) or logical channel group (LCG) to traffic pattern or traffic type. The base station may configure such an association into the UE. The signaling of the association may be explicit, i.e. the base station may explicitly configure it into the UE, for each LCH or LCG, one or more associated traffic patterns or traffic types. Alternatively, the signaling of the association may be implicit in the sense that, the traffic pattern or type may be implicitly derived by the UE from the LCH or LCG configuration. The base station learns from the BSR, the traffic pattern or traffic type associated with the BSR.

In another exemplary embodiment, the UE may inform the base station of the traffic pattern or traffic type whose data is awaiting transmission during the random access procedure. The UE may use RACH preamble or other RACH resources for e.g. physical RACH resource to inform the base station of the traffic pattern or traffic type whose data is awaiting transmission. For example, the UE may transmit the random access message on RACH preamble or physical RACH resources associated with the pattern or the type of the traffic awaiting transmission. In another exemplary embodiment, the UE may inform the base station of the pattern or type or the traffic awaiting transmission in the initial UE message, for example RACH message 3 (in the case of 4-steps contention-based RACH procedure) or RACH message 1 (in the case of dedicated RACH procedure or 2-steps RACH procedure). In this exemplary embodiment, the UE may explicitly include in the initial UE message, an information element to inform the base station of the pattern or type of the traffic awaiting transmission. The base station learns during the RACH procedure for e.g. from the random access preamble used, or the RACH resources used, or the from the UE initial message, the pattern or type of traffic awaiting transmission in the UE.

Multiple CORESETs or CORESET patterns may be configured into the UE, where different CORESETs or CORESET patterns may be configured for different traffic patterns or traffic type. For example, CORESET sparse in time domain may be associated with traffic with long inter-packet arrival time while CORESET with higher density of control resource occurrence in time may be configured for short inter-packet arrival time. Similarly, sparse versus dense control resource occurrences in frequency domain may be configured into the UE. From the resource grant, the UE may learn the PDCCH monitoring pattern and when the UE is required to monitor PDCCH. Using this knowledge, the UE may adapt DRX active time. More specifically, the UE may adapt the DRX inactive timer, the DRX on-duration timer or the DRX cycle according to traffic patterns or control resource monitoring pattern detected from the resource grant or the CORESET assignment indicated by the base station. The adaptation of the DRX inactive timer or DRX-on-duration timer or DRX cycle may be done within the framework of one DRX configuration parameter set per cell group (or per cell). The adaptation of the DRX inactive timer or DRX-on-duration timer or DRX cycle may also be done within the framework of two or more DRX configuration parameter sets per cell group (or cell). In the latter case, a UE configured with a DRX configuration parameter set for a given cell group may change the on-duration time or inactivity timer for DRX operation on the given cell group by switching to another DRX configuration parameter set configured for the same cell group (or cell). In the case of one DRX configuration parameter set per cell group (or cell), the UE may not switch the entire DRX configuration parameter set, but will rather adjust the value of the inactivity timer or the value of the on-duration timer or the value of the DRX cycle. Based on the grant or the CORESET or CORESET pattern indicated to the UE by the base station after reception of SR, BSR or RACH, the UE may do one or more of the following: shorten the DRX inactive time, extend the DRX inactive timer, sleeps between control resource occurrences, sleeps at the end of ON-duration and delay the start of DRX inactive timer, shorten the on-duration timer possibly setting the value to zero to skip DRX cycle, extend on-duration timer, switch DRX cycle for e.g. from short to long DRX cycle or from long to short DRX cycle, switch BWP.

RRC may configure into the UE, traffic pattern or traffic type specific SR resources, i.e. association between SR resource and traffic pattern or traffic type. RRC may configure into the UE, association between LCH or LCG and traffic pattern or traffic type. Similarly, RRC may configure into the UE, association between traffic pattern or traffic type, and RACH preamble or RACH resources. DCI or MAC CE may control DRX adaption in the UE for e.g. CORESET or CORESET pattern switching, shortening of DRX inactive time, extending DRX inactive timer, sleeping between control resource occurrences, sleeping at the end of ON-duration and delay the start of DRX inactive timer, shortening of the on-duration timer, extending on-duration timer, switching DRX cycle for e.g. from short to long DRX cycle or from long to short DRX cycle, switching of BWP.
Power Savings Effect on MAC—PDCCH Monitoring Reduction Through DRX Adaptation—DRX Adaptation Based on Adaptation of PDCCH Monitoring Duty Cycle—Coordination of Explicit PDCCH Skipping Command and MAC Procedures It has been agreed the PDCCH skipping command has no effect on MAC DRX operation. But depending on DRX and other MAC procedures the physical layer procedure for PDCCH skipping may need to be affected.

Depending on the state of certain MAC procedures reception of a PDCCH skipping command may be ignored. For example, the network may not be aware of an initiated MAC procedure (e.g. SR, RA, HARQ . . . ) and choose to transmit a PDCCH skipping command. In these cases, the UE may ignore the PDCCH skipping command.

One way to accomplish this would be for the MAC to explicitly signal the physical layer depending on the state of certain MAC procedures. For example, upon RA preamble or SR triggering a new signal from the MAC could indicate to the PHY to disable the PDCCH skipping procedure. And upon completion (e.g. UL grant received for SR or RA procedure completion) the MAC may generate a enable PDCCH skipping procedure indication.

Another way to accomplish this would be for the physical layer to implicitly detect the need to disable PDCCH skipping operation. For example, upon reception of an SR or RA preamble transmission request from the MAC, PDCCH skipping could be autonomously disabled by the physical layer. Similarly, the physical layer could implicitly enable PDCCH shipping. For example, upon grant reception for the SR transmission case, and upon completion of the RA procedure for the preamble initiated disabling case.
Power Savings Effect on MAC—PDCCH Monitoring Reduction Through DRX Adaptation—Coordination of DRX and BWP Operation Ensuring a UE is configured with a suitable BWP is critical to minimizing the UE power consumption. When a UE is actively communicating with the network, a BWP that is appropriate for the type of services the UE is supporting should be activated. And when the communication pauses, a BWP that is optimized for power savings should be used.

Currently, DRX and BWP Operation procedures are performed independently by the MAC. Furthermore, for NR the same DRX configuration is applied regardless of the BWP that is activated. To optimize UE power savings, there is coordination between the DRX and BWP operation procedures. In addition, allowing a UE to be configured with multiple DRX configurations that are optimized for different types of services and can be dynamically activated/deactivated simultaneously with the activation of a suitable BWP can also provide additional power savings.

Figure 5:
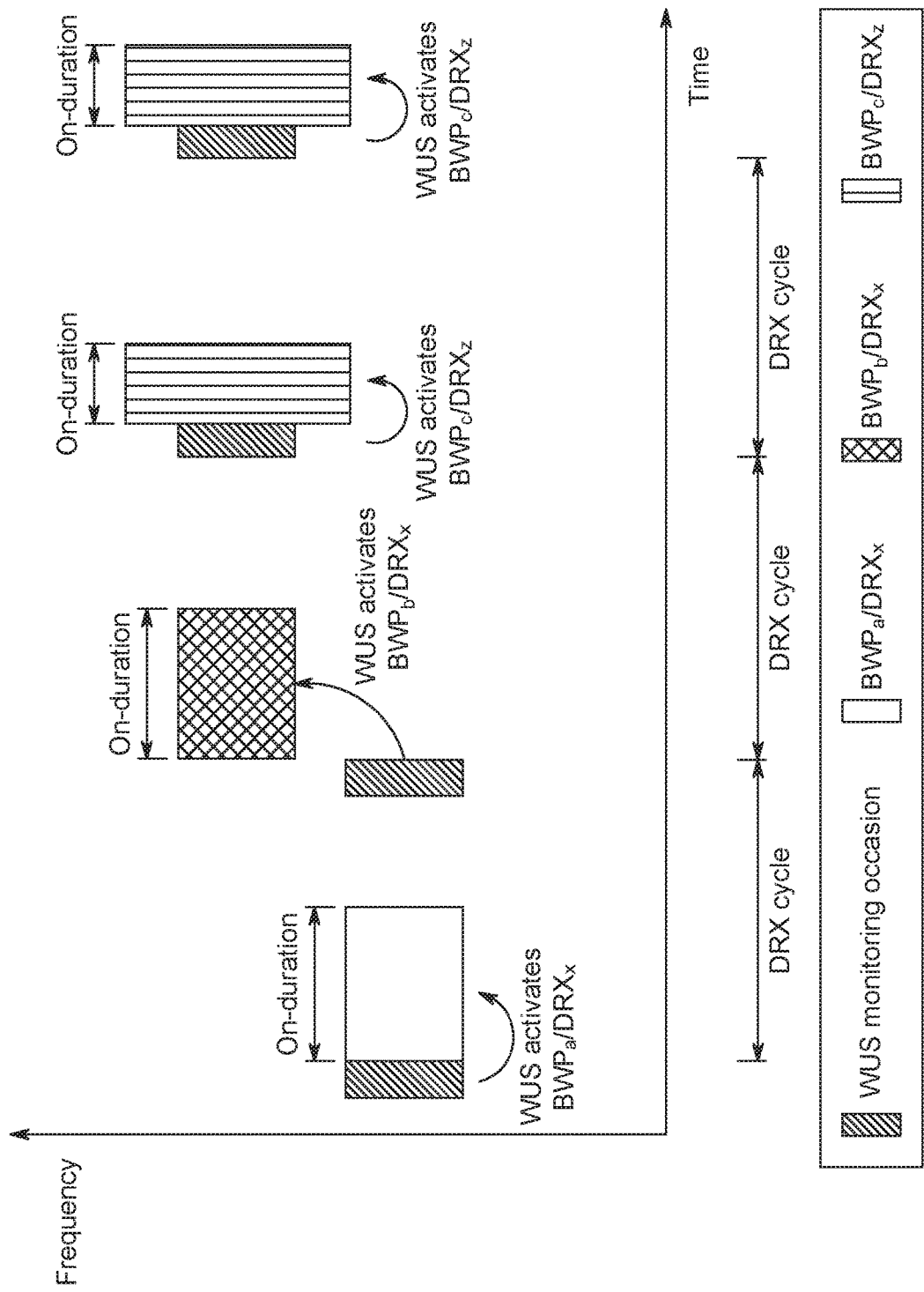
FIG. 5 is a graph showing coordination of DRX and BWP operation based on explicit signaling in accordance with an exemplary embodiment.

The coordination between the DRX and BWP Operation procedures may be accomplished through explicit signaling transmitted by the network. FIG. 5 is an example where the WUS is used to simultaneously activate a BWP and DRX configuration. However, transmission of a coordinated DRX/BWP activation command via another physical layer control channel; e.g. PDCCH or GC-PDCCH, is not precluded. In this example, the DRX configurations are shown to have the same DRX cycle; and the CORESET for the WUS monitoring occasion is shown to be in the active BWP. However, using different DRX cycles for each DRX configuration is not precluded. Nor is using a CORESET for the WUS monitoring occasion that is outside the active BWP.

Figure 6:
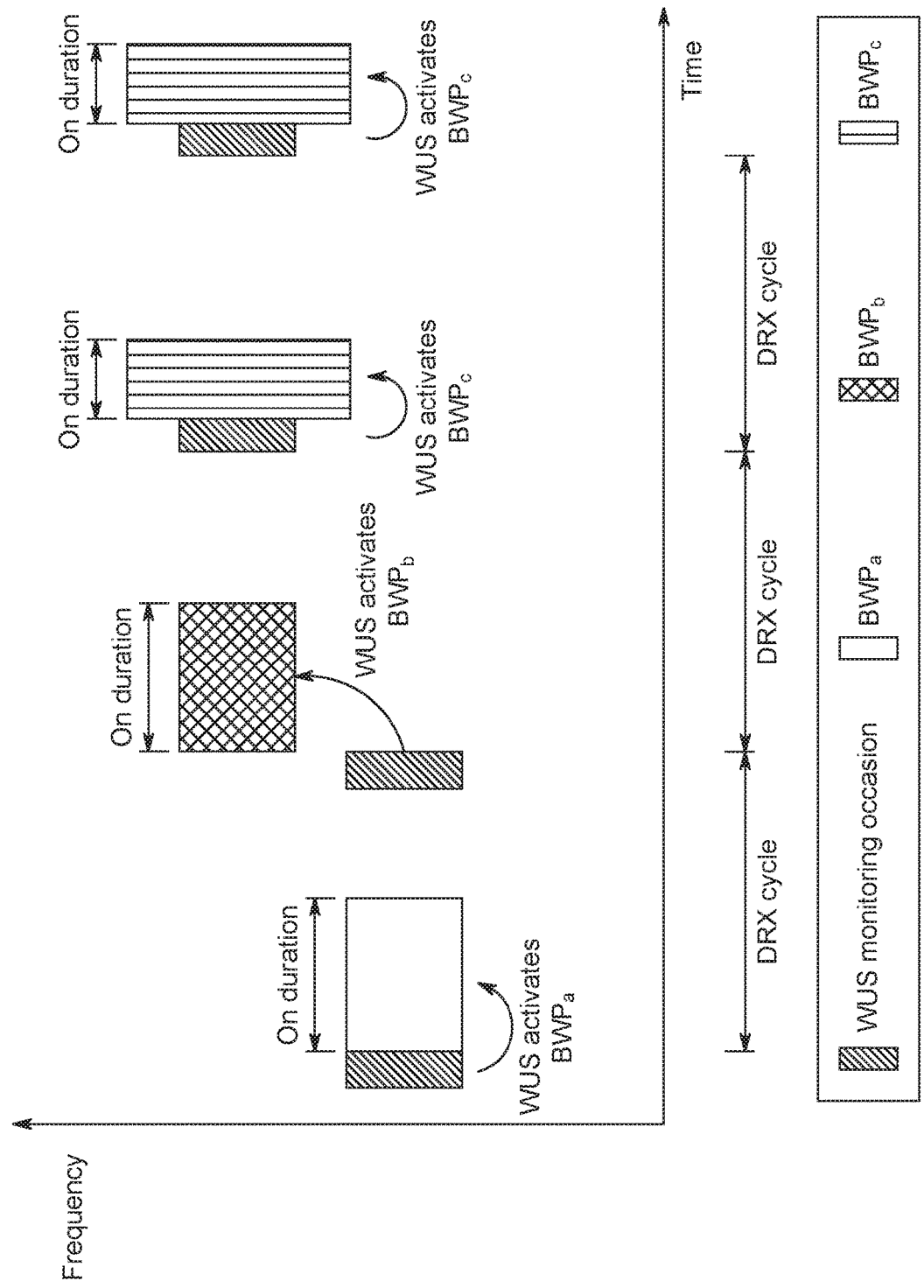
FIG. 6 is a graph showing coordination of DRX and BWP operation based on BWP in accordance with an exemplary embodiment.

Alternatively, a DRX configuration may be configured for each BWP as shown in FIG. 6, thereby allowing a suitable DRX configuration to be activated implicitly when a BWP activated. The DRX configuration used for a given BWP may be configured via higher layer signaling; e.g. RRC. The BWP activation command may be signaled via the WUS or a physical layer control channel; e.g. PDCCH or GC-PDCCH. In this alternative, the DRX activation command is not explicitly signaled, but is implied base on which BWP is activated. It may also be possible for the WUS to signal a BWP switch without a subsequent on-duration.

Figure 7:
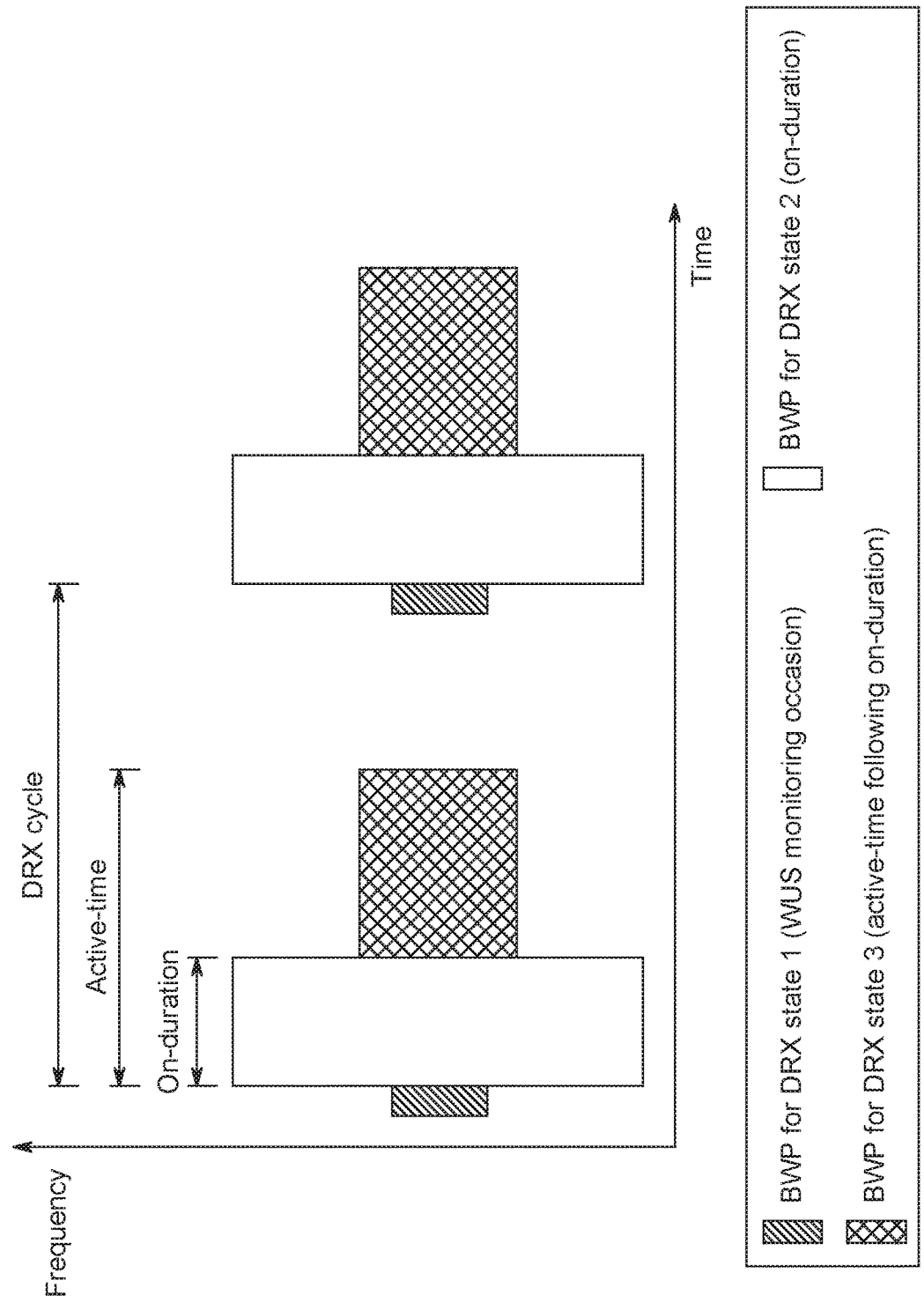
FIG. 7 is a graph showing coordination of DRX and BWP operation based on DRX state in accordance with an exemplary embodiment.

And in another alternative, a BWP may be configured per DRX state, thereby allowing a suitable BWP to be activated implicitly when the UE transitions to a different DRX state. The DRX configuration used for a given DRX state may be configured via higher layer signaling; e.g. RRC. FIG. 7 shows an example where the time that corresponds to the WUS monitoring occasion may be defined as the first DRX state; the time that corresponds to the on-duration is defined as the second DRX state; and the time that corresponds to the portion of the active-time following the on-duration; i.e. where the drx-onDurationTimer has expired, is defined as the third DRX state.

NR defines the parameter bwp-InactivityTimer that is defined as the duration (e.g. ms, slots, symbols, etc.) after which the UE falls back to the default BWP, if configured, or the initial DL BWP otherwise. To ensure the UE is configured with a suitable BWP during the active-time; i.e. the UE does not fall back to the default/initial BWP during the active-time, the control of bwp-InactivityTimer should be coordinated with the DRX procedure.

Power Savings Effect on MAC—PDCCH Monitoring Reduction Through DRX Adaptation—PDCCH Monitoring Reduction and Efficient Use of UL Resources Through Consolidation of UL Transmissions When DRX is applied (the UE is not within active time), an SR transmission is triggered and the UE enables PDCCH reception based on SR pending criteria. For some UE traffic this procedure may be unnecessary, and the UE could wait until the next DRX cycle or until other high priority data becomes available for UL transmission.

Each logical channel could be configured with a delay tolerance. If data becomes available for transmission while within DRX and the next DRX cycle start is within the logical channels delay tolerance the SR may not be triggered or delayed. With this method when UL transmission is initiated additional data may be consolidated and one larger transmission may be initiated rather than several smaller independent transmissions which would further improve power consumption efficiency.

Upon SR triggering, an SR delay timer could be set to the delay tolerance of the logical channel that triggered the SR. Upon expiration of the SR delay timer the SR may be triggered. The SR delay timer may be cleared upon reception of an UL grant for other reasons, and the SR trigger is cleared upon servicing of the UL transmission or transmission of a BSR.

An SR may also be delayed depending on volume of UL data available to be transmitted. In addition to logical channel delay tolerance or as independent criteria an SR could be initiated when a data volume threshold is reached. This may be per individual logical or may consider data volume across multiple logical channels.

Power Savings Effect on MAC—PDCCH Monitoring Reduction with No DRX Configuration In this case it is assumed that DRX is not configured.

Power Savings Effect on MAC—PDCCH Monitoring Reduction with No DRX Configuration—PDCCH Monitoring Reduction Through Power Savings Signal or Channel In this class of solutions, the UE is not assumed to have a DRX configuration. The network exclusively controls when the UE is awake or asleep by use of a power savings signal/channel. The power savings signal/channel may correspond to a Wakeup Signal (WUS) or a Go-to-Sleep (GTS) signal. PHY signaling that is sequence or PDCCH based may be used. Alternatively, higher layer signaling that is MAC CE or RRC based may also be used.

The WUS may be used to dynamically signal if one or more PDCCH monitoring occasions can be skipped, the CORESETs to monitor during the PDCCH monitoring occasions, when the UE can enter sleep and/or when it should wakeup, etc.

Power Savings Effect on MAC—PDCCH Monitoring Reduction with No DRX Configuration—PDCCH Skipping Based on Explicit Command In this case, the DRX is not configured into the UE and the UE does not perform DRX procedure. The UE performs PDCCH skipping based on explicit PDCCH command from base station.

Power Savings Effect on MAC—PDCCH Monitoring Reduction with No DRX Configuration—PDCCH Skipping with No Explicit Command In this case, the DRX is not configured into the UE and the UE doesn't perform the DRX procedure. The UE performs PDCCH skipping autonomously or based on implicit command from the base station. For example, if the user indicates no desire to receive mobile terminated calls, the UE may stop PDCCH monitoring.

Power Savings Effect on MAC—UE Assistance Information

In support of any of the UE PDCCH monitoring reduction methods described above, the UE may provide assistance information to the network in order to assist the network in selecting a power saving scheme (for e.g. WUS, GTS, PDCCH skipping, PDCCH monitoring duty cycle on PCell or SCell, etc.) and the appropriate configuration parameters for DRX and any of the power saving schemes described herein.

UE Assistance Information May Include, for Example:
  Mobility history information
  Preferred DRX configuration, for e.g. preferred short DRX cycle value, preferred long DRX cycle value, preferred DRX inactivity timer value, preferred short DRX cycle timer value.
  Preferred BWP configuration, for e.g. including the maximum aggregated bandwidth i.e. the sum of bandwidth across all active uplink BWPs.

Preferred SCell or secondary component carrier configuration, for e.g., maximum number of secondary component carriers.
Information of application the UE intend to UE
Pattern of the traffic the UE intent to generate
Location information
Power saving mode and desired level of power saving mode for e.g. High power saving mode intend to indicate to the network that the UE is interested in high reduction of power consumption, medium power saving mode for medium reduction of power consumption and low power saving mode for low reduction of power consumption.
User Intention for e.g. no interest in receiving mobile terminated calls.

Power Savings Enhancements for Specific MAC Procedures
Power Savings Enhancements for Specific MAC Procedures—Discontinuous Reception (DRX)

A power savings signal/channel is used to dynamically adapt the UE's DRX behavior. The power savings signal/channel may correspond to the WUS described herein. A UE may be configured with monitoring occasions for the WUS that occur before or at the beginning of the DRX on-duration. The DRX configuration indicated via the WUS may apply for the next N DRX cycles, where N≥1.

Dynamic Skipping of DRX On-Duration

In this solution, dynamic skipping of the DRX on-duration is performed for scenarios where DL traffic is not transmitted during some DRX cycles. This allows a UE to immediately return to DRX rather than waiting for the drx-onDurationTimer to expire. The skip indication may be implicit; e.g. detection of the WUS indicates the PDCCH should be monitored during the on-duration and failure to detect the WUS indicates PDCCH monitoring during the on-duration should be skipped. Alternatively, the WUS may explicitly indicate if PDCCH monitoring should be performed or skipped during the on-duration. For example, DCI signaled via a PDCCH-based WUS as described herein may be used to indicate if the DRX on-duration can be skipped.

In a first exemplary embodiment, the UE is configured with WUS monitoring occasions that occur before the DRX on duration. At the start of the DRX cycle, the MAC entity checks if the notification of on-duration skipping has not been received from lower layers. If not, the drx-onDurationTimer is started and the UE enters the Active Time for this DRX cycle. Otherwise, the drx-onDurationTimer is not started and the UE does not enter the Active Time for this DRX cycle.

To implement this behavior, the MAC DRX procedure could be defined as follows:

When DRX is configured, the MAC entity shall:

```
...
1>  if the Short DRX Cycle is used, and [(SFN x 10) + subframe number] modulo (drx-ShortCycle) = (drx-StartOffset) modulo (drx-ShortCycle); or
1>  if the Long DRX Cycle is used, and [(SFN x 10) + subframe number] modulo (drx-LongCycle) = drx-StartOffset:
    2>  if the notification of on-duration skipping has not been received from lower layers
        3>   start drx-onDurationTimer after drx-SlotOffset from the beginning of the subframe.
...
```

For scenarios where Carrier Aggregation is configured, the WUS may include a single indication for skipping the on-duration for all Serving Cells in the Cell Group, in which case the behavior would be as described above.

Alternatively, the WUS may include a separate indication for each Serving Cell in the Cell Group, thereby allowing the on-duration to be skipped for each cell independently. For example, DCI signaled via a PDCCH-based WUS may include a Skip Indicator field for each configured Serving Cell or group of Serving Cells. The fields may be ordered such that the position of the field indicates the Serving Cell to which it applies. For example, the zeroth field may correspond to the SpCell, and the remaining fields may correspond to the SCells, where the (ith+1) field corresponds to the SCell with SCellIndex i.

And in yet another alternative, a separate WUS may be transmitted by each Serving Cell. The UE may monitor the WUS on each Serving Cell thereby allowing the on-duration to be skipped for each cell independently.

To facilitate on-duration skipping for each Serving Cell independently, drx-onDurationTimer and drx-InactivityTimer per Serving Cell are defined. The drx-onDurationTimer for each Serving Cell may then be started independently based on the notification of on-duration skipping received from lower layers; and the drx-InactivityTimer for each Serving Cell may then be started independently based on the activity of the corresponding Serving Cell.

The drx-onDurationTimer and drx-InactivityTimer fields in the DRX-Config IE may be used to configure the initial values of the corresponding timers if a common value is used for all Serving Cells in the Cell Group. Alternatively, these fields may be modified as shown below to facilitate configuring different drx-onDurationTimer and drx-InactivityTimer values for each Serving Cell in the Cell Group.

Exemplary Drx-InactivityTimer Field with Values Per Serving Cell

```
drx-InactivityTimer   SEQUENCE { size (1..maxNrofServingCells )) of ENUMERATED {
                      ms0, ms1, ms2, ms3, ms4, ms5, ms6, ms8, ms10, ms20, ms30, ms40,
                      ms50, ms60, ms80, ms 100, ms200, ms300, ms500, ms750, ms1280,
                      ms1920, ms2560, spare9, spare8, spare7, spare6, spare5, spare4, spare3,
                      spare2, spare1
                      }
```

Exemplary Drx-onDurationTimer Field with Values Per Serving Cell

```
drx-onDurationTimer SEQUENCE { size
(1..maxNrofServingCells )) of CHOICE {
    subMilliSeconds              INTEGER (1..31),
    milliSeconds                 ENUMERATED {
    ms1, ms2, ms3, ms4, ms5, ms6, ms8, ms10, ms20, ms30, ms40,
    ms50,ms60, ms80, ms100, ms200, ms300, ms400, ms500, ms600,
    ms800, ms1000, ms1200, ms1600, spare8, spare7, spare6,
    spare5, spare4,spare3, spare2, spare1
    }
}
``` or ra-ContentionResolutionTimer is running for any Serving Cell; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble;

And the Active Time of an SCell Includes the Time while:

drx-onDurationTimer or drx-InactivityTimer for the SCell is running; or drx-RetransmissionTimerDL or drx-RetransmissionTimerUL for a HARQ process for the SCell is running.

When DRX is configured, the MAC entity shall:

```
...
1>  if a DRX Command MAC CE or a Long DRX Command MAC CE is received:
    2>      stop drx-onDurationTimer for all Serving Cells;
    2>      stop drx-InactivityTimer for all Serving Cells.
1>  if drx-InactivityTimer for the SpCell expires or a DRX Command MAC CE is
received:
    2>      if the Short DRX cycle is configured:
        3>      start or restart drx-ShortCycleTimer in the first symbol after the
        expiry of drx-InactivityTimer for the SpCell or in the first symbol after the end of
        DRX Command MAC CE reception;
        3>      use the Short DRX Cycle.
    2>      else:
        3>      use the Long DRX cycle.
...
1>  if the Short DRX Cycle is used, and [(SFN x 10) + subframe number] modulo
(drx-ShortCycle) = (drx-StartOffset) modulo (drx-ShortCycle); or
1>  if the Long DRX Cycle is used, and [(SFN x 10) + subframe number] modulo
(drx-LongCycle) = drx-StartOffset:
    2>      start drx-onDurationTimer after drx-SlotOffset from the beginning of the
subframe for the Serving Cells for which the notification of on-duration skipping has not
been received from lower layers.
1>  if the MAC entity is in Active Time for a Serving Cell:
    2>      monitor the PDCCH for the Serving Cell;
    2>      if the PDCCH for the Serving Cell indicates a DL transmission:
        3>      start the drx-HARQ-RTT-TimerDL for the corresponding HARQ
    process in the first symbol after the end of the corresponding transmission
    carrying the DL HARQ feedback;
        3>      stop the drx-RetransmissionTimerDL for the corresponding HARQ
    process.
    2>      if the PDCCH indicates a UL transmission:
        3>      start the drx-HARQ-RTT-TimerUL for the corresponding HARQ
    process in the first symbol after the end of the first repetition of the corresponding
    PUSCH transmission;
        3>      stop the drx-RetransmissionTimerUL for the corresponding HARQ
    process.
    2>      if the PDCCH indicates a new transmission (DL or UL):
        3>      start or restart drx-InactivityTimer for the Serving Cell in the first
    symbol after the end of the PDCCH reception.
```

To Implement the Behavior, the MAC DRX Procedure can be Defined as Follows:

When a DRX cycle is configured, the Active Time for the SpCell includes the time while:

drx-onDurationTimer or drx-InactivityTimer or drx-RetransmissionTimerDL or drx-RetransmissionTimerUL Dynamic Adapting of DRX Configuration In this exemplary embodiment, scenarios are considered where the DL traffic pattern may change from one DRX cycle to the next. During a given DRX cycle, the UE behavior may be adapted such that different DRX configuration parameter values may be applied to match the DRX behavior to the DL traffic pattern. The WUS may explicitly indicate the values for one or more DRX configuration parameters. For example, DCI signaled via a PDCCH-based WUS as described herein may be used to dynamically configure the duration of the DRX timers.

- Note: The "Skipping of DRX On-Duration" embodiment can be viewed as a special case of this embodiment, where the configuration parameter drx-onDuration-Timer is configured with the value 0 s.
- UE monitors for power saving signal/channel just before or at the beginning of the on-duration
- Power saving signal/channel may include info that is used to adapt DRX behavior; e.g. skip on-duration, adapt timer values
- Inactivity timer may be started upon detection of power saving signal/channel . . . on duration timer would not be needed
- DCI-based signaling may be used to configure "light/micro" sleep during the active time; i.e. enable PDCCH skipping
- Power saving signal/channel may be transmitted on each activated SCell and used to adapt the DRX behavior on each SCell independently; only monitor the PDCCH for SCells where the power saving signal/channel is received.

Dynamic Switching of DRX Configuration

In this exemplary embodiment, a UE is configured with a plurality of DRX configurations, where one configuration is considered the active configuration and the others are considered candidate configurations; and a trigger is used to dynamically switch the active DRX configuration. An explicit trigger transmitted by the network may be DCI, MAC CE or RRC based. Alternatively, a rules-based mechanism may be defined as an implicit trigger. The plurality of DRX configurations may be signaled via higher layers; e.g. RRC, and may be identified by an index that is used to make reference to a given configuration. UE assistance information may be reported to enable optimal selection of the active DRX configuration by the network.

In a first exemplary embodiment, a MAC CE is used to switch to the active DRX configuration. The DRX Configuration Activation MAC CE includes a field to identify the active DRX configuration.

Figure 8:
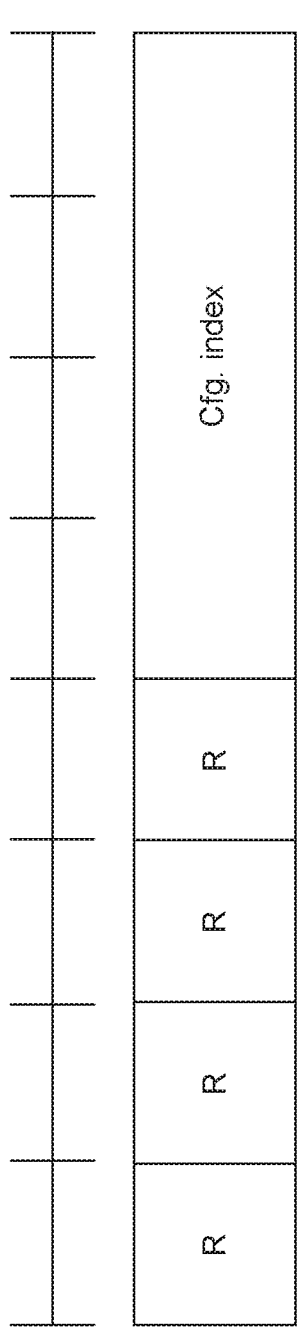
FIG. 8 is an illustration of a DRX Configuration Activation MAC CE in accordance with an exemplary embodiment.

FIG. 8 is an illustration of a an exemplary DRX Configuration Activation MAC CE. The DRX Configuration Activation MAC CE is identified by a MAC PDU subheader with a unique LCID. In this example, it has a fixed size and consists of a single octet defined as follows:

R: Reserved bit, set to "0";

Cfg Index: This field indicates the index of the DRX configuration to be activated. The field is of fixed length and is 4 bits in this example.

NR supports the DRX Command MAC CE that commands the UE to enter DRX and the Long DRX Command MAC CE that commands the UE to enter DRX and switch to the Long DRX cycle. Both these MAC CEs have a fixed size of zero bits. These MAC CEs are redefined such that they may also be used to switch the active DRX configuration. For example, the MAC CEs may be redefined to have a fixed size of a single octet and use the same definition as the DRX Configuration Activation MAC CE shown in FIG. 8.

To implement this behavior, the MAC DRX procedure could be defined as follows:

When DRX is configured, the MAC entity shall:

```
...
1>   if a DRX Configuration Activation MAC CE is received:
    2> if the active DRX configuration is not the DRX configuration indicated by the
DRX Configuration Activation MAC CE;
        2>   activate the DRX configuration indicated by the DRX Configuration
Activation MAC CE.
...
1>   if a DRX Command MAC CE or a Long DRX Command MAC CE is received:
        2>   stop drx-onDurationTimer;
        2>   stop drx-InactivityTimer.
        2> if the active DRX configuration is not the DRX configuration indicated by the
MAC CE;
            3> activate the DRX configuration indicated by the MAC CE.
1>   if drx-InactivityTimer expires or a DRX Command MAC CE is received:
        2>   if the Short DRX cycle is configured:
            3>   start or restart drx-ShortCycleTimer in the first symbol after the
expiry of drx-InactivityTimer or in the first symbol after the end of DRX
Command MAC CE reception;
            3>   use the Short DRX Cycle.
        2>   else:
            3>   use the Long DRX cycle.
1>   if drx-ShortCycleTimer expires:
        2>   use the Long DRX cycle.
1>   if a Long DRX Command MAC CE is received:
        2>   stop drx-ShortCycleTimer;
        2>   use the Long DRX cycle.
        2> if the active DRX configuration is not the DRX configuration indicated by the
Long DRX Command MAC CE;
            3> activate the DRX configuration indicated by the MAC CE.
...
```

In a second exemplary embodiment, a DCI signaled via a PDCCH or PDCCH-based WUS is used to switch to the active DRX configuration.

To implement this behavior, the MAC DRX procedure could be defined as follows:

When DRX is Configured, the MAC Entity Shall:

---

```
...
1>   if the PDCCH indicates a DRX configuration should be activated:
    2>   if the active DRX configuration is not the DRX configuration indicated by
PDCCH
        3>          activate the DRX configuration indicated by the PDCCH.
...
```

---

In a third exemplary embodiment, a rules-based mechanism is used to switch the active DRX configuration. The rules used to switch the active configuration may defined in the specification or known to the UE through provisioning or pre-configuration. For example, a rule where the active DRX configuration is based on the traffic type may be defined. The rule may associate a DRX configuration with a Logical Channel or Logical Channel Group. The association may be provided to the UE via higher layer signaling; e.g. RRC.

An adaption time may be defined at the beginning of the DRX cycle, during which the UE determines the traffic type and activates the appropriate DRX configuration, that is then applied for the DRX cycle. The adaption time may correspond to a separate time that occurs before the active duration. Alternatively, the adaption time may overlap with some or all of the time that corresponds to the on duration. During the adaption time, timer values associated with a default DRX configuration may be used. The default DRX configuration may be defined in the specification or known to the UE through provisioning or pre-configuration. Alternatively, the default configuration may correspond to the DRX configuration selected during the previous DRX cycle.

To enable the selection of a DRX configuration for scenarios where DL assignments and/or UL grants corresponding to a plurality of traffic types are received during the adaption time, a priority is defined for each Logical Channel/Logical Channel Group. The MAC would then select the DRX configuration associated with highest priority traffic type that was present during the adaption time.

To implement this behavior, the MAC DRX procedure could be defined as follows:

When a DRX cycle occurs and DRX Adaption is configured, the Adaption Time corresponds to the time while drx-adaptionTimer is running.

When DRX is configured, the MAC entity shall:

---

```
...
1>    if the Short DRX Cycle is used, and [(SFN x 10) + subframe number] modulo
(drx-ShortCycle) = (drx-StartOffset) modulo (drx-ShortCycle); or
1>    if the Long DRX Cycle is used, and [(SFN x 10) + subframe number] modulo
(drx-LongCycle) = drx-StartOffset:
        2>    if DRX adaption is configured:
            3>    activate the default DRX configuration;
            3>    start drx-adaptionTimer after drx-SlotOffset from the beginning of
        the subframe.
        2>    else:
            3>    start drx-onDurationTimer after drx-SlotOffset from the beginning
        of the subframe.
...
1>    if drx-adaptionTimer expires:
        2>    start drx-onDurationTimer.
...
1>    if the MAC entity is in Active Time:
        2>    monitor the PDCCH;
        2>    if the PDCCH indicates a new transmission (DL or UL):
            3>    start or restart drx-InactivityTimer in the first symbol after the end
        of the PDCCH reception.
            3>    if the MAC entity is in the Adaption Time:
                4>    if the priority of the new transmission is higher than the
            priority of the active DRX configuration, activate the DRX configuration
            associated with the priority of the new transmission.
        2>    if the PDCCH indicates a DL transmission:
            3>    start the drx-HARQ-RTT-TimerDL for the corresponding HARQ
        process in the first symbol after the end of the corresponding transmission
        carrying the DL HARQ feedback:
            3>    stop the drx-RetransmissionTimerDL for the corresponding HARQ
        process.
        2>    if the PDCCH indicates a UL transmission:
            3>    start the drx-HARQ-RTT-TimerUL for the corresponding HARQ
        process in the first symbol after the end of the first repetition of the corresponding
        PUSCH transmission;
            3>    stop the drx-RetransmissionTimerUL for the corresponding HARQ
        process.
```

---

Aperiodic DRX Cycle

In this solution, a UE monitors for a power saving signal/channel and if it is detected, a DRX cycle is triggered.

Figure 9:
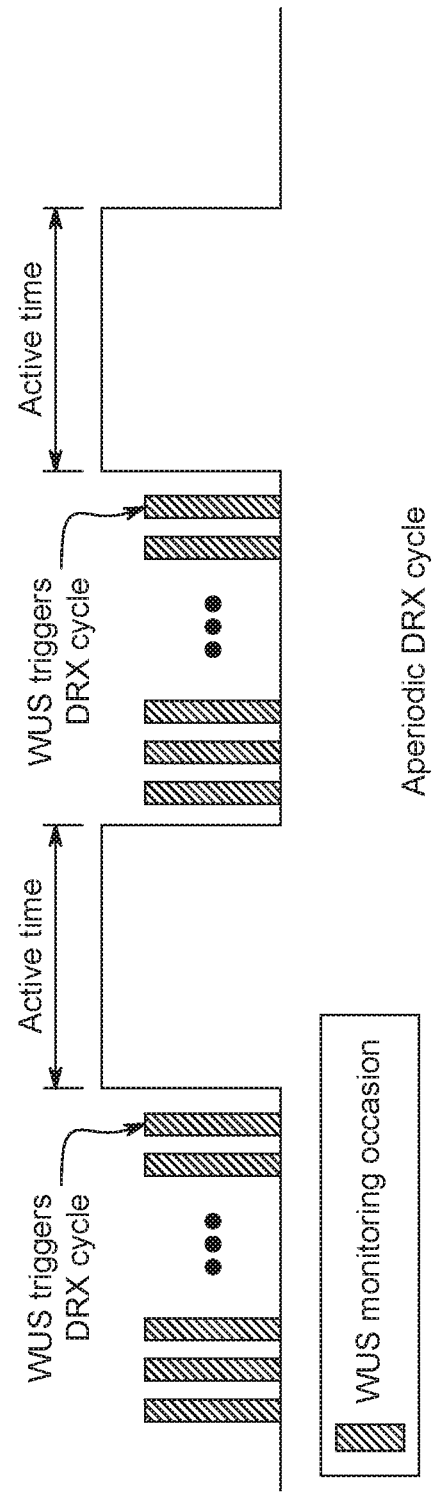
FIG. 9 is a graph of an aperiodic DRX cycle triggered by a WUS in accordance with an exemplary embodiment.

The monitoring of the power savings signal/channel; e.g. WUS, occurs at known monitoring occasions that are configured densely in the time domain and may occur continuously or with a periodicity that has a resolution of symbols, slots or subframes. An illustration of an aperiodic DRX cycle triggered by a WUS is shown in FIG. 9.

Maintaining Independent Active Times for Each Serving Cell

Figure 10:
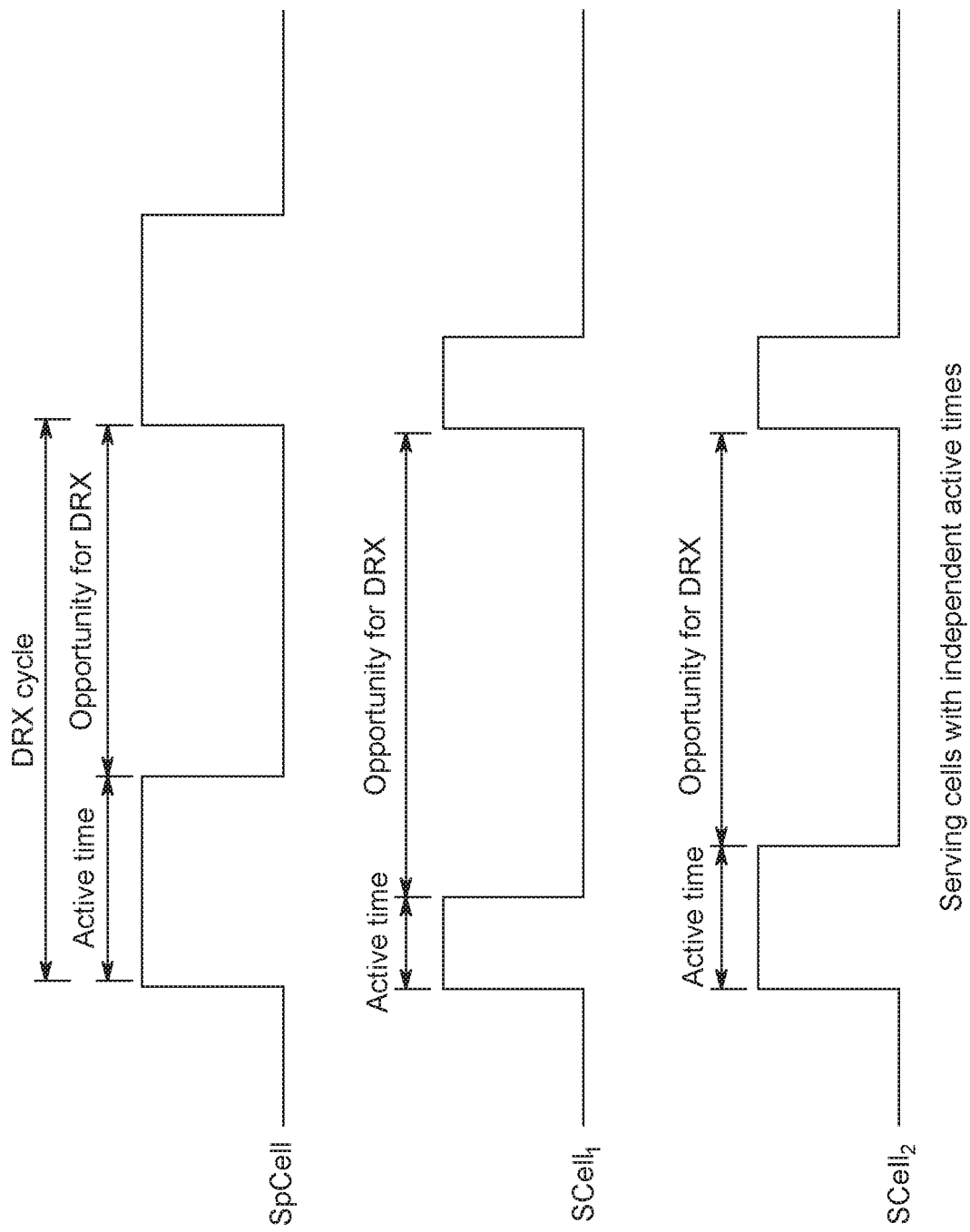
FIG. 10 is a graph showing a DRX cycle with different serving cells having independent active times in accordance with an exemplary embodiment.

In this solution, independent Active Times are maintained for each Serving Cell, thereby allowing a UE to enter DRX for one or more serving cells while being in the Active Time for the other Serving Cells as shown in FIG. 10. The Active Time of a Serving Cell is a function of the DRX timers maintained for that Serving Cell; e.g. drx-onDurationTimer, drx-InactivityTimer, drx-RetransmissionTimerDL, drx-RetransmissionTimerUL, ra-ContentionResolutionTimer. One or more DRX timers maintained for the other Serving Cells in the Cell Group may also be considered when determining the Active Time of a Serving Cell.

For example, in the case of an SCell, basing the Active Time solely on the timers maintained for that SCell allows the UE to enter DRX for that SCell independent of the activity of the other Serving Cells. While in the case of the SpCell, basing the Active Time on the DRX timers associated with the SpCell and the SCells prevents the SpCell from entering DRX if one or more SCells are in the Active Time.

In a first exemplary embodiment, the UE maintains a separate drx-InactivityTimer, for each Serving Cell and define the Active Time for the SpCell and the SCells as follows:

When a DRX cycle is configured, the Active Time of an SpCell includes the time while:
  drx-onDurationTimer is running; or
  drx-InactivityTimer for any of the Serving Cells in the Cell Group is running; or
  drx-RetransmissionTimerDL or drx-RetransmissionTimerUL or ra-ContentionResolutionTimer is running; or
  a Scheduling Request is sent on PUCCH and is pending; or
  a PDCCH indicating a new transmission addressed to the C-RNTI of the MAC entity has not been received after successful reception of a Random Access Response for the Random Access Preamble not selected by the MAC entity among the contention-based Random Access Preamble;

and the Active Time of an SCell includes the time while:
  drx-onDurationTimer is running; or
  drx-InactivityTimer or drx-RetransmissionTimerDL or drx-RetransmissionTimerUL for the SCell is running.

The drx-InactivityTimer field in the DRX-Config IE may be used to configure the initial values of the timers if a common value is used for all Serving Cells in the Cell group. Alternatively, if different values are configured for each Serving Cell in the Cell Group, the Exemplary drx-InactivityTimer Field with Values per Serving Cell described herein may be used.

To implement this behavior, the MAC DRX procedure could be defined as follows:

When DRX is configured, the MAC entity shall:

```
...
1>    if a DRX Command MAC CE or a Long DRX Command MAC CE is received:
        2>    stop drx-onDurationTimer;
        2>    stop drx-InactivityTimer for all Serving Cells.
...
1>    if drx-InactivityTimer expires for the SpCell or a DRX Command MAC CE is
received:
        2>    if the Short DRX cycle is configured:
                3>    start or restart drx-ShortCycleTimer in the first symbol after the
            expiry of drx-InactivityTimer for the SpCell or in the first symbol after the end of
            DRX Command MAC CE reception;
                3>    use the Short DRX Cycle.
        2>    else:
                3>    use the Long DRX cycle.
...
1>    if the MAC entity is in Active Time for a Serving Cell:
        2>    monitor the PDCCH for the Serving Cell;
        2>    if the PDCCH indicates a DL transmission:
                3>    start the drx-HARQ-RTT-TimerDL for the corresponding HARQ
            process in the first symbol after the end of the corresponding transmission
            carrying the DL HARQ feedback;
                3>    stop the drx-RetransmissionTimerDL for the corresponding HARQ
            process.
        2>    if the PDCCH indicates a UL transmission:
                3>    start the drx-HARQ-RTT-TimerUL for the corresponding HARQ
            process in the first symbol after the end of the first repetition of the corresponding
            PUSCH transmission;
                3>    stop the drx-RetransmissionTimerUL for the corresponding HARQ
            process.
        2>    if the PDCCH indicates a new transmission (DL or UL):
                3>    start or restart drx-InactivityTimer for the Serving Cell in the first
            symbol after the end of the PDCCH reception.
...
```

In a second exemplary embodiment, the UE maintains a separate drx-onDurationTimer and drx-InactivityTimer for each Serving Cell in the Cell Group and define the Active Time for the SpCell and the SCells as follows:

When a DRX cycle is configured, the Active Time of an SpCell includes the time while:
  drx-onDurationTimer for any of the Serving Cells in the Cell Group is running; or
  drx-InactivityTimer for any of the Serving Cells in the Cell Group is running; or drx-RetransmissionTimerDL or drx-Retransmission-TimerUL or ra-ContentionResolutionTimer is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble;

and the Active Time of an SCell includes the time while:
drx-onDurationTimer for the SCell is running; or
drx-InactivityTimer or drx-RetransmissionTimerDL or drx-RetransmissionTimerUL for the SCell is running.

The value of each timer may be configured via higher layer signaling; e.g. RRC. For example, the Exemplary drx-InactivityTimer Field with Values per Serving Cell and Exemplary drx-onDurationTimer Field with Values per Serving Cell fields described herein may be included in the DRX-Config IE.

To implement this behavior, the MAC DRX procedure could be defined as in the first exemplary embodiment with the following modifications:

When DRX is configured, the MAC entity shall:

---

```
...
1>   if a DRX Command MAC CE or a Long DRX Command MAC CE is received:
        2>   stop drx-onDurationTimer for all Serving Cells;
        2>   stop drx-InactivityTimer for all Serving Cells.
...
1>   if the Short DRX Cycle is used, and [(SFN x 10) + subframe number] modulo
(drx-ShortCycle) = (drx-StartOffset) modulo (drx-ShortCycle); or
1>   if the Long DRX Cycle is used, and [(SFN x 10) + subframe number] modulo
(drx-LongCycle) = drx-StartOffset:
        2>   start drx-onDurationTimer for all Serving Cells after drx-SlotOffset from
        the beginning of the subframe.
...
```

---

In this exemplary embodiment, the drx-onDurationTimer for all Serving Cells is started at the beginning of the DRX cycle. Alternatively, the drx-onDurationTimer for the SCells may be started upon receiving the first indication of a new PDCCH transmission on the SpCell.

To implement this behavior, the clauses in the MAC DRX procedure related to starting the drx-onDurationTimer for the Serving Cells could be defined as follows:

When DRX is configured, the MAC entity shall:

---

```
...
1>   if the Short DRX Cycle is used, and [(SFN x 10) + subframe number] modulo
(drx-ShortCycle) = (drx-StartOffset) modulo (drx-ShortCycle); or
1>   if the Long DRX Cycle is used, and [(SFN x 10) + subframe number] modulo
(drx-LongCycle) = drx-StartOffset:
        2>           start drx-onDurationTimer for the SpCell after drx-SlotOffset from the
beginning of the subframe.
...
        if the MAC entity is in Active Time for a Serving Cell:
        2>           monitor the PDCCH for the Serving Cell;
        2>           if the PDCCH indicates a DL transmission:
                3>           start the drx-HARQ-RTT-TimerDL for the corresponding HARQ
process in the first symbol after the end of the corresponding transmission
carrying the DL HARQ feedback;
                3>           stop the drx-RetransmissionTimerDL for the corresponding HARQ
process.
        2>           if the PDCCH indicates a UL transmission:
                3>           start the drx-HARQ-RTT-TimerUL for the corresponding HARQ
process in the first symbol after the end of the first repetition of the corresponding
PUSCH transmission;
                3>           stop the drx-RetransmissionTimerUL for the corresponding HARQ
process.
        2>           if the PDCCH indicates a new transmission (DL or UL):
                3>           If the new transmission is the first transmission for the SpCell
during the DRX cycle:
                        4>           start drx-onDurationTimer for each SCell;
                3>           start or restart drx-InactivityTimer for the correspond Serving Cell
in the first symbol after the end of the PDCCH reception.
...
```

In a third exemplary embodiment, the UE maintains an sCell-drx-InactivityTimer that applies for all SCells in the Cell Group and define the Active Time for the SpCell and the SCells as follows:

When a DRX cycle is configured, the Active Time of an SpCell includes the time while:
  drx-onDurationTimer or drx-InactivityTimer or sCell-drx-InactivityTimer or drx-RetransmissionTimerDL or drx-RetransmissionTimerUL or ra-ContentionResolutionTimer is running; or a Scheduling Request is sent on PUCCH and is pending; or
  a PDCCH indicating a new transmission addressed to the C-RNTI of the MAC entity has not been received after successful reception of a Random Access Response for the Random Access Preamble not selected by the MAC entity among the contention-based Random Access Preamble;
and the Active Time of an SCell includes the time while:
  drx-onDurationTimer or sCell-drx-InactivityTimer; or
  drx-RetransmissionTimerDL or drx-RetransmissionTimerUL for the SCell is running.

The value of sCell-drx-InactivityTimer may be configured via higher layer signaling; e.g. RRC. For example, the sCell-drx-InactivityTimer may be included as a field in the DRX-Config IE and defined as shown below.

```
sCell-drx-InactivityTimer  ENUMERATED {
    ms0, ms1, ms2, ms3, ms4, ms5, ms6, ms8, ms10, ms20, ms30,
    ms40, ms50, ms60, ms80, ms100, ms200, ms300, ms500, ms750,
    ms1280, ms1920, ms2560, spare9, spare8, spare7, spare6, spare5,
    spare4, spare3, spare2, spare1
}
```

To implement this behavior, the MAC DRX procedure could be defined as follows:

When DRX is configured, the MAC entity shall:

```
...
1> if a DRX Command MAC CE or a Long DRX Command MAC CE is received:
    2>  stop drx-onDurationTimer;
    2>  stop drx-InactivityTimer,
    2>  stop sCell-drx-InactivityTimer.
1> if drx-InactivityTimer expires or a DRX Command MAC CE is received:
    2>  if the Short DRX cycle is configured:
        3>  start or restart drx-ShortCycleTimer in the first symbol after the expiry of
        drx-InactivityTimer or in the first symbol after the end of DRX Command MAC CE
        reception;
        3>  use the Short DRX Cycle.
    2>  else:
        3>  use the Long DRX cycle.
1> if drx-ShortCycleTimer expires:
    2>  use the Long DRX cycle.
1> if a Long DRX Command MAC CE is received:
    2>  stop drx-ShortCycleTimer;
    2>  use the Long DRX cycle.
1> if the Short DRX Cycle is used, and [(SFN x 10) + subframe number] modulo (drx-
ShortCycle) = (drx-StartOffset) modulo (drx-ShortCycle); or
1> if the Long DRX Cycle is used, and [(SFN x 10) + subframe number] modulo (drx-
LongCycle) = drx-StartOffset:
    2>  start drx-onDurationTimer after drx-SlotOffset from the beginning of the
subframe.
1> if the MAC entity is in Active Time for a Serving Cell:
    2>  monitor the PDCCH for the Serving Cell;
    2>  if the PDCCH indicates a DL transmission:
        3>  start the drx-HARQ-RTT-TimerDL for the corresponding HARQ process
        in the first symbol after the end of the corresponding transmission carrying the DL
        HARQ feedback;
        3>  stop the drx-RetransmissionTimerDL for the corresponding HARQ
    process.
    2>  if the PDCCH indicates a UL transmission:
        3>  start the drx-HARQ-RTT-TimerUL for the corresponding HARQ process
        in the first symbol after the end of the first repetition of the corresponding PUSCH
        transmission;
        3>  stop the drx-RetransmissionTimerUL for the corresponding HARQ
    process.
    2>  if the PDCCH indicates a new transmission (DL or UL) for the SpCell:
        3>  start or restart drx-InactivityTimer in the first symbol after the end of the
        PDCCH reception.
    2>  else if the PDCCH indicates a new transmission (DL or UL) for an SCell:
        3>  start or restart sCell-drx-InactivityTimer in the first symbol after the end
        of the PDCCH reception.
```

Dynamic Reconfiguration of Cross-Carrier Scheduling

In this solution, the cross-carrier scheduling configuration is dynamically reconfigured for a UE using PHY (e.g. DCI) and/or MAC (e.g. MAC CE) layer signaling. To reduce PDCCH monitoring on the SCells, one of the Serving Cells; e.g. the SpCell, may be configured to cross-carrier scheduled one or more SCells. Thereafter, when a burst of DL traffic is to be scheduled for the SCell(s), the network may dynamically reconfigure the cross-carrier scheduling configuration such that one or more of the SCells in the Cell Group are self-scheduled. And when the DL traffic pauses, the network may dynamically reconfigure the cross-carrier scheduling configuration such that one or more of the SCells in the Cell Group are again cross-carrier scheduled.

In a first exemplary embodiment, the self/cross-carrier scheduled configurations are provided by higher layers; e.g.

RRC, and a MAC CE is used to dynamically switch between self/cross-carrier scheduling configurations for one or more SCells.

FIG. 11 is an illustration of a an exemplary Cross-Carrier Configuration MAC CE. The Cross-Carrier Configuration MAC CE is identified by a MAC PDU subheader with a unique LCID. In this example, it has a fixed size and is defined as follows:

Si: If there is an SCell configured for the MAC entity with SCellIndex i, this field indicates the cross-carrier scheduling configuration of the SCell with SCellIndex i, else the MAC entity shall ignore the Si field. The Si field is set to "0" to indicate that the SCell with SCellIndex i shall be self-scheduled. The Si field is set to "1" to indicate that the SCell with SCellIndex i shall be cross-carrier scheduled.

R: Reserved bit, set to "0";

In a second exemplary embodiment, a timer and/or counter based cross-carrier scheduling may be used. For example, if a UE has not been self-scheduled on a particular SCell during X ms, it falls back to cross-carrier scheduling. If the UE is scheduled on the SCell with one cross-carrier DCI, it again activates self-scheduling on the SCell. Alternatively, if the UE is cross-carrier scheduled N times (to the particular SCell) within T ms, then it again activates self-scheduling.

Power Savings Enhancements for Specific MAC Procedures—Bandwidth Part (BWP) Operation To ensure that a UE remains configured with a suitable BWP during the active-time, the BWP Operation procedure is enhanced such that upon expiration of bwp-InactivityTimer the UE only falls back to the default/initial BWP if it is not in the active-time.

To implement this behavior, the MAC BWP Operation procedure could be defined as follows:

```
2>   if the bwp-InactivityTimer associated with the active DL BWP expires/is
expired; and
    2>   if DRX is configured and the MAC entity is not in the Active Time:
        3>       if the defaultDownlinkBWP-Id is configured:
            4>       perform BWP switching to a BWP indicated by the
        defaultDownlinkBWP-Id.
        3>       else:
            4>       perform BWP switching to the initialDownlinkBWP.
```

To ensure that a UE remains configured with a suitable BWP, the BWP Operation procedure is enhanced such that the BWP is switched when the UE transitions to a new DRX state. For example, the DRX cycle may be defined to include a plurality of DRX states and a BWP may be associated with each DRX state. In one example, 3 DRX states are defined where State 1 corresponds to the time when the UE monitors the WUS; State 2 corresponds to the Active Time during the on duration and State 3 corresponds to the Active Time after the on duration. BWP1, BWP2 and BWP3 are associated with DRX State 1, DRX State 2 and DRX State 3 respectively.

To implement this behavior, the MAC BWP Operation procedure could be defined as follows:

```
1>   if DRX is configured:
    2>   if the MAC entity is in the Active Time:
        3>       if drx-onDurationTimer is running, and the active DL BWP is not
    the BWP associated with DRX State 2:
            4>   perform BWP switching to a BWP indicated by DRX State 2.
        3>       else if drx-onDurationTimer is not running, and the active DL
    BWP is not the BWP indicated by DRX State 3:
            4>   perform BWP switching to a BWP indicated by DRX State 3.
    2>   else if the active DL BWP is not the BWP indicated by [DRX BWP 1]:
        3>       perform BWP switching to a BWP indicated by [DRX BWP 1].
```

In an exemplary embodiment, a first apparatus (e.g., a UE 102, 300) includes a processor (e.g., processor 118); and a memory (e.g., non-removable memory 130, removable memory 132, etc.). The memory storing computer-executable instructions that when executed by the processor cause the first apparatus to: receive, from a second apparatus (e.g., a network 302, base station, etc.), information including a plurality of Discontinuous Reception (DRX) configurations, wherein one of the plurality of DRX configurations is a first active DRX configuration and other DRX configurations are candidate DRX configurations; perform Physical Downlink Control Channel (PDCCH) monitoring in accordance with the first active DRX configuration; monitor signaling from the second apparatus for an indication that is used for adapting the first active DRX configuration; receive from the second apparatus an indication for adapting the first active DRX configuration into a second active DRX configuration; based on the indication for adapting the first active DRX configuration into the second active DRX configuration, adapt the first active DRX configuration into the second active DRX configuration; and perform PDCCH monitoring in accordance with the second active DRX configuration.

In an exemplary embodiment, the indication for adapting the first active DRX indication includes information that indicates which candidate DRX configuration among the plurality of DRX configurations should become the second active DRX configuration.

In an exemplary embodiment, the indication for adapting the first active DRX configuration includes a new drx-onDurationTimer value.

In an exemplary embodiment, the indication for adapting the first active DRX configuration includes a new drx-InactivityTimer value.

In an exemplary embodiment, the indication for adapting the first active DRX configuration includes a scale factor that is used to scale one or more DRX timer values.

In an exemplary embodiment, the first apparatus is configured to perform PDCCH monitoring for a plurality of cells, and the indication for adapting the first active DRX configuration includes a plurality of Skip Indicator fields with one Skip indicator field per serving cell or group of serving cells, that are used to indicate if PDCCH monitoring should be skipped for an associated DRX cycle or cycles for corresponding Serving Cells.

In an exemplary embodiment, the indication for adapting the first active DRX configuration is signaled using Downlink Control Information (DCI).

In an exemplary embodiment, the first apparatus monitors for the DCI during monitoring occasions that occur before a DRX on-Duration.

In an exemplary embodiment, the monitoring occasions are configured via Radio Resource Configuration (RRC) signaling.

In an exemplary embodiment, the indication for adapting the first active DRX configuration is signaled using a Medium Access Control (MAC) Control Element (CE).

In an exemplary embodiment, the indication for adapting the first active DRX configuration includes a Bandwidth Part (BWP) activation command that is used to activate an inactive BWP.

In an exemplary embodiment, the first apparatus is configured to report assistance information to the second apparatus. In an exemplary embodiment, the assistance information includes an indication of a desired level of power savings.

In an exemplary embodiment, the first apparatus reports assistance information to the second apparatus. In an exemplary embodiment, the assistance information includes an indication of a desired level of power savings.

In an exemplary embodiment, the first apparatus is configured to report assistance information to the second apparatus. In an exemplary embodiment, the assistance information includes a preferred DRX configuration.

In an exemplary embodiment, the first apparatus reports assistance information to the second apparatus. In an exemplary embodiment, the assistance information includes a preferred DRX configuration.

In an exemplary embodiment, the first apparatus is configured to report assistance information to the second apparatus. In an exemplary embodiment, the assistance information includes a preferred BWP configuration.

In an exemplary embodiment, the first apparatus reports assistance information to the second apparatus. In an exemplary embodiment, the assistance information includes a preferred BWP configuration.

In an exemplary embodiment, the first apparatus is a user equipment.

In an exemplary embodiment, the second apparatus is a base station.

In an exemplary embodiment, a method is performed by a first apparatus, the method including: receiving, from a second apparatus, information including a plurality of Discontinuous Reception (DRX) configurations, wherein one of the plurality of DRX configurations is a first active DRX configuration and other DRX configurations are candidate DRX configurations; performing Physical Downlink Control Channel (PDCCH) monitoring in accordance with the first active DRX configuration; monitoring signaling from the second apparatus for an indication that is used for adapting the first active DRX configuration; receiving from the second apparatus an indication for adapting the first active DRX configuration into a second active DRX configuration; based on the indication for adapting the first active DRX configuration into the second active DRX configuration, adapting the first active DRX configuration into the second active DRX configuration; and performing PDCCH monitoring in accordance with the second active DRX configuration.

In an exemplary embodiment, a non-transitory computer-readable medium includes computer-executable instructions, which when executed by a first apparatus, cause the first apparatus to perform a method, the method including: receiving, from a second apparatus, information including a plurality of Discontinuous Reception (DRX) configurations, wherein one of the plurality of DRX configurations is a first active DRX configuration and other DRX configurations are candidate DRX configurations; performing Physical Downlink Control Channel (PDCCH) monitoring in accordance with the first active DRX configuration; monitoring signaling from the second apparatus for an indication that is used for adapting the first active DRX configuration; receiving from the second apparatus an indication for adapting the first active DRX configuration into a second active DRX configuration; based on the indication for adapting the first active DRX configuration into the second active DRX configuration, adapting the first active DRX configuration into the second active DRX configuration; and performing PDCCH monitoring in accordance with the second active DRX configuration.

It will be understood that any of the methods and processes described herein may be embodied in the form of computer executable instructions (i.e., program code) stored on a computer-readable storage medium, and when the instructions are executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information, and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

ABBREVIATIONS AND DEFINITIONS

BA Bandwidth Adaption
BSR Buffer Status Report
BWP Bandwidth Part
CORESET Control Resource Set
DCI Downlink Control Information
DL Downlink
DRX Discontinuous Reception
eNB Evolved Node B
gNB NR NodeB
GTS Go-to-Sleep
IE Information Element
L1 Layer 1
LCG Logical Channel Group
LCH Logical Channel
MAC Medium Access Control
MAC CE MAC Control Element
NR New Radio
OFDM Orthogonal Frequency Division Multiplexing
PDCCH Physical Downlink Control Channel
PHY Physical Layer
RAN Radio Access Network
RNTI Radio Network Temporary Identifier
RRC Radio Resource Control
RRM Radio Resource Management
SCell Secondary Cell
SpCell Special Cell
SFN System Frame Number
SR Scheduling Request
SS Synchronization Signal
SSB SS Block
TRP Transmission and Reception Point
UE User Equipment
UL Uplink
UPT User Perceived Throughput
V2X Vehicle-to-X Communication
WUS Wakeup Signal

What is claimed is:

1. A first apparatus comprising:
a processor; and
a memory coupled with the processor, the memory storing executable instructions that when executed by the processor cause the processor to effectuate operations comprising:
receiving, from a second apparatus, a first discontinuous reception (DRX) configuration for a first serving cell of a cell group, and a second DRX configuration for a second serving cell of the cell group,
wherein the first DRX configuration for the first serving cell comprises a first drx-onDurationTimer and a first drx-InactivityTimer,
wherein the second DRX configuration for the second serving cell comprises a second drx-onDurationTimer and a second drx-InactivityTimer, and
wherein the first drx-onDurationTimer and the first drx-InactivityTimer of the first DRX configuration for the first serving cell are separately configured from the second drx-onDurationTimer and the second drx-InactivityTimer of the second DRX configuration for the second serving cell;
performing physical downlink control channel (PDCCH) monitoring in accordance with the first DRX configuration for the first serving cell and the second DRX configuration for the second serving cell; and
receiving a wake-up signal (WUS) that comprises a first indication for the first serving cell of the cell group that indicates whether an active time defined by the first DRX configuration should be skipped, and a second indication for the second serving cell of the cell group that indicates whether an active time defined by the second DRX configuration should be skipped.

2. The first apparatus of claim 1, wherein the first serving cell is associated with an active time, wherein the active time of the first serving cell comprises a time while the first drx-onDurationTimer or the first drx-InactivityTimer of the first DRX configuration for the first serving cell is running.

3. The first apparatus of claim 1, wherein the second serving cell is associated with an active time, wherein the active time of the second serving cell comprises a time while the second drx-onDurationTimer or the second drx-InactivityTimer of the second DRX configuration for the second serving cell is running.

4. The first apparatus of claim 1, wherein the first DRX configuration for the first serving cell comprises a first drx-RetransmissionTimerDL and a first drx-RetransmissionTimerUL, wherein the first serving cell is associated with an active time, wherein the active time of the first serving cell comprises a time while the first drx-Retransmission TimerDL or the first drx-RetransmissionTimerUL is running.

5. The first apparatus of claim 1, wherein the second DRX configuration for the second serving cell comprises a second drx-RetransmissionTimerDL and a second drx-RetransmissionTimerUL, wherein the second serving cell is associated with an active time, wherein the active time of the second serving cell comprises a time while the second drx-RetransmissionTimerDL or the second drx-RetransmissionTimerUL is running.

6. The first apparatus of claim 1, the operations further comprising when a DRX Command medium access control (MAC) control element (CE) or a Long DRX Command MAC CE is received, performing one or more of the followings:
   stopping the first drx-onDurationTimer and the first drx-InactivityTimer of the first DRX configuration for the first serving cell,
   stopping the second drx-onDurationTimer and the second drx-InactivityTimer of the second DRX configuration for the second serving cell.

7. The first apparatus of claim 1, wherein the first DRX configuration for the first serving cell comprises a short DRX cycle, and when the Short DRX Cycle is used for the first serving cell, and [(SFN×10)+subframe number] modulo (drx-ShortCycle)=(drx-StartOffset) modulo (drx-ShortCycle), starting drx-onDuration Timer for the first serving cell after drx-SlotOffset from beginning of the subframe.

8. The first apparatus of claim 1, wherein the first DRX configuration for the first serving cell comprises a long DRX cycle, and when the Long DRX cycle is used for the first serving cell, and [(SFN×10)+subframe number] modulo (drx-LongCycle)=drx-StartOffset, starting drx-onDurationTimer for the first serving cell after drx-SlotOffset from the beginning of the subframe.

9. The first apparatus of claim 1, the operations further comprising:
   when a medium access control (MAC) entity is in Active Time for the first serving cell, monitoring PDCCH on the first serving cell; or
   when the MAC entity is in Active Time for the second serving cell, monitoring PDCCH on the second serving cell.

10. The first apparatus of claim 1, the operations further comprising:
    when the PDCCH indicates a new UL transmission or new DL transmission on the first serving cell, starting or restarting drx-InactivityTimer for the first serving cell in the first symbol after the end of the PDCCH reception; or
    when the PDCCH indicates a new UL transmission or new DL transmission on the second serving cell, starting or restarting drx-InactivityTimer for the second serving cell in the first symbol after the end of the PDCCH reception.

11. The first apparatus of claim 1, wherein the second DRX configuration for the second serving cell comprises a short DRX cycle, and when the Short DRX Cycle is used for the second serving cell, and [(SFN×10)+subframe number] modulo (drx-ShortCycle)=(drx-StartOffset) modulo (drx-ShortCycle), starting drx-onDurationTimer for the second serving cell after drx-SlotOffset from beginning of the subframe.

12. The first apparatus of claim 1, wherein the second DRX configuration for the second serving cell comprises a long DRX cycle, and when the Long DRX cycle is used for the second serving cell, and [(SFN×10)+subframe number] modulo (drx-LongCycle)=drx-StartOffset, starting drx-onDurationTimer for the second serving cell after drx-SlotOffset from the beginning of the subframe.

13. The first apparatus of claim 1, wherein the first DRX configuration for the first serving cell comprises a first short DRX cycle or a first long DRX cycle, the first apparatus is configured to monitor a Wakeup Signal (WUS), and when in DRX active time on the first serving cell, the first apparatus does not monitor WUS, and the apparatus behaves as if a WUS instructed the first apparatus to wake-up, and the first apparatus applies the first drx-onDurationTimer at start of a next first short DRX cycle or start of a next first long DRX cycle.

14. The first apparatus of claim 1, wherein the second DRX configuration for the second serving cell comprises a second short DRX cycle or a second long DRX cycle, the first apparatus is configured to monitor a Wakeup Signal (WUS), and when in DRX active time on the first serving cell, the apparatus does not monitor WUS, and the first apparatus behaves as if a WUS instructed the first apparatus to wake-up, and the first apparatus applies the second drx-onDurationTimer at start of a next second short DRX cycle or start of a next second long DRX cycle.

15. The first apparatus of claim 1, wherein the first apparatus reports assistance information to the second apparatus for power saving, wherein the assistance information comprises the preferred maximum aggregated bandwidth.

16. The first apparatus of claim 1, wherein the first apparatus reports assistance information to the second apparatus for power saving, wherein the assistance information comprises a preferred DRX configuration.

17. The first apparatus of claim 1, wherein the first apparatus reports assistance information to the second apparatus for power saving, wherein the assistance information comprises a preferred maximum number of secondary component carriers.

18. The first apparatus of claim 1, wherein the first apparatus is a user equipment and the second apparatus is a base station.

19. A method performed by a first apparatus, the method comprising:
    receiving, from a second apparatus, a first discontinuous reception (DRX) configuration for a first serving cell of a cell group, and a second DRX configuration for a second serving cell of the cell group,
    wherein the first DRX configuration for the first serving cell comprises a first drx-onDurationTimer and a first drx-InactivityTimer,
    wherein the second DRX configuration for the second serving cell comprises a second drx-onDurationTimer and a second drx-InactivityTimer, and
    wherein the first drx-onDurationTimer and the first drx-InactivityTimer of the first DRX configuration for the first serving cell are separately configured from the second drx-onDurationTimer and the second drx-InactivityTimer of the second DRX configuration for the second serving cell;
    performing physical downlink control channel (PDCCH) monitoring in accordance with the first DRX configuration for the first serving cell and the second DRX configuration for the second serving cell; and
    receiving a wake-up signal (WUS) that comprises a first indication for the first serving cell of the cell group that indicates whether an active time defined by the first DRX configuration should be skipped, and a second indication for the second serving cell of the cell group that indicates whether an active time defined by the second DRX configuration should be skipped.

20. A non-transitory computer-readable medium including computer-executable instructions, which when executed by a first apparatus, cause the first apparatus to perform a method, the method comprising:

receiving, from a second apparatus, a first discontinuous reception (DRX) configuration for a first serving cell of a cell group, and a second DRX configuration for a second serving cell of the cell group, wherein the first DRX configuration for the first serving cell comprises a first drx-onDurationTimer and a first drx-InactivityTimer, wherein the second DRX configuration for the second serving cell comprises a second drx-onDurationTimer and a second drx-InactivityTimer, and wherein the first drx-onDurationTimer and the first drx-Inactivity Timer of the first DRX configuration for the first serving cell are separately configured from the second drx-onDurationTimer and the second drx-InactivityTimer of the second DRX configuration for the second serving cell;

performing physical downlink control channel (PDCCH) monitoring in accordance with the first DRX configuration for the first serving cell and the second DRX configuration for the second serving cell; and receiving a wake-up signal (WUS) that comprises a first indication for the first serving cell of the cell group that indicates whether an active time defined by the first DRX configuration should be skipped, and a second indication for the second serving cell of the cell group that indicates whether an active time defined by the second DRX configuration should be skipped.

* * * * *